United States Patent [19]
Tsutsui et al.

[11] Patent Number: 6,075,760
[45] Date of Patent: *Jun. 13, 2000

[54] SYSTEM FOR PERFORMING FOCUSING OPERATION WHEN RECORDING AND/OR REPRODUCING DATA ON MULTILAYERED OPTICAL DISKS

[75] Inventors: Keiichi Tsutsui, Kanagawa; Katsuji Igarashi, Tokyo, both of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/881,887

[22] Filed: Jun. 24, 1997

Related U.S. Application Data

[62] Division of application No. 08/662,492, Jun. 13, 1996, Pat. No. 5,751,675.

[30] Foreign Application Priority Data

Jun. 16, 1995 [JP] Japan .................................. 7-149899

[51] Int. Cl.[7] ...................................................... G11B 7/00
[52] U.S. Cl. ................................... 369/44.27; 369/44.29; 369/44.34
[58] Field of Search ............................... 369/94, 112, 58, 369/44.27, 44.29, 275.3, 275.4, 44.25

[56] References Cited

U.S. PATENT DOCUMENTS

| | | | |
|---|---|---|---|
| 4,823,330 | 4/1989 | Arter et al. | 369/45 |
| 5,202,875 | 4/1993 | Rosen et al. | 369/112 |
| 5,297,114 | 3/1994 | Itoh et al. | 369/58 |
| 5,351,224 | 9/1994 | Nagata et al. | 369/44.29 |
| 5,408,453 | 4/1995 | Holtslag et al. | 369/94 |
| 5,414,451 | 5/1995 | Sugiyama et al. | 347/258 |
| 5,463,602 | 10/1995 | Oka et al. | 369/44.29 |
| 5,559,772 | 9/1996 | Takeda | 369/44.25 |
| 5,574,706 | 11/1996 | Verboom et al. | 369/44.25 |
| 5,642,340 | 6/1997 | Nomura | 369/44.25 |
| 5,663,942 | 9/1997 | Ishibashi et al. | 369/44.36 |
| 5,671,203 | 9/1997 | Ra | 369/44.27 |
| 5,701,288 | 12/1997 | Seong | 369/94 |
| 5,708,638 | 1/1998 | Braat et al. | 369/112 |
| 5,745,450 | 4/1998 | Miyazono | 369/44.25 |
| 5,761,164 | 11/1994 | Abe et al. | 369/44.25 |
| 5,764,619 | 6/1998 | Nishiuchi et al. | 369/94 |
| 5,864,530 | 6/1995 | Holtslag et al. | 369/94 |

*Primary Examiner*—Nabil Hindi
*Attorney, Agent, or Firm*—Frommer Lawrence & Haug, LLP; William S. Frommer

[57] ABSTRACT

The invention provides a recording and/or reproduction apparatus and a recording and/or reproduction method by which information can be recorded or reproduced accurately onto or from any of a plurality of record layers of an optical disk. In the recording and/or reproduction method, after an optical disk is started, an optimum focus offset position for a predetermined record layer of the optical disk is searched for. This searching is performed by varying an offset value stepwise and searching for an offset value with which the amplitude of a tracking error signal exhibits a maximum value. After an optimum focus offset position is searched out, the value of it is stored. Similar processing is performed also for any other record layer. When an instruction to reproduce a predetermined record layer is developed in step, focus jumping to the record layer is performed. Then, an optimum focus offset value searched out and stored in advance is read out and added to a focus error signal.

8 Claims, 21 Drawing Sheets

AMPLITUDE-SKEW SENSOR OUTPUT CHARACTERISTIC

TRACKING ERROR SIGNAL WAVEFORM UPON INITIAL OPERATION

SEARCH FOR POINT AT WHICH
INTERMEDIATE POINT EXHIBITS
MINIMUM VALUE WITH RESPECT TO
VARIATION OF ADJUSTMENT VALUE

MAXIMUM AMPLITUDE SEARCH METHOD 1

JITTERS-FOCUS OFFSET CHARACTERISTIC

SEARCH FOR POINT AT WHICH
INTERMEDIATE POINT EXHIBITS
MINIMUM VALUE WITH RESPECT TO
VARIATION OF ADJUSTMENT VALUE

MINIMUM JITTERS SEARCH METHOD 1

MINIMUM JITTERS SEARCH METHOD 2

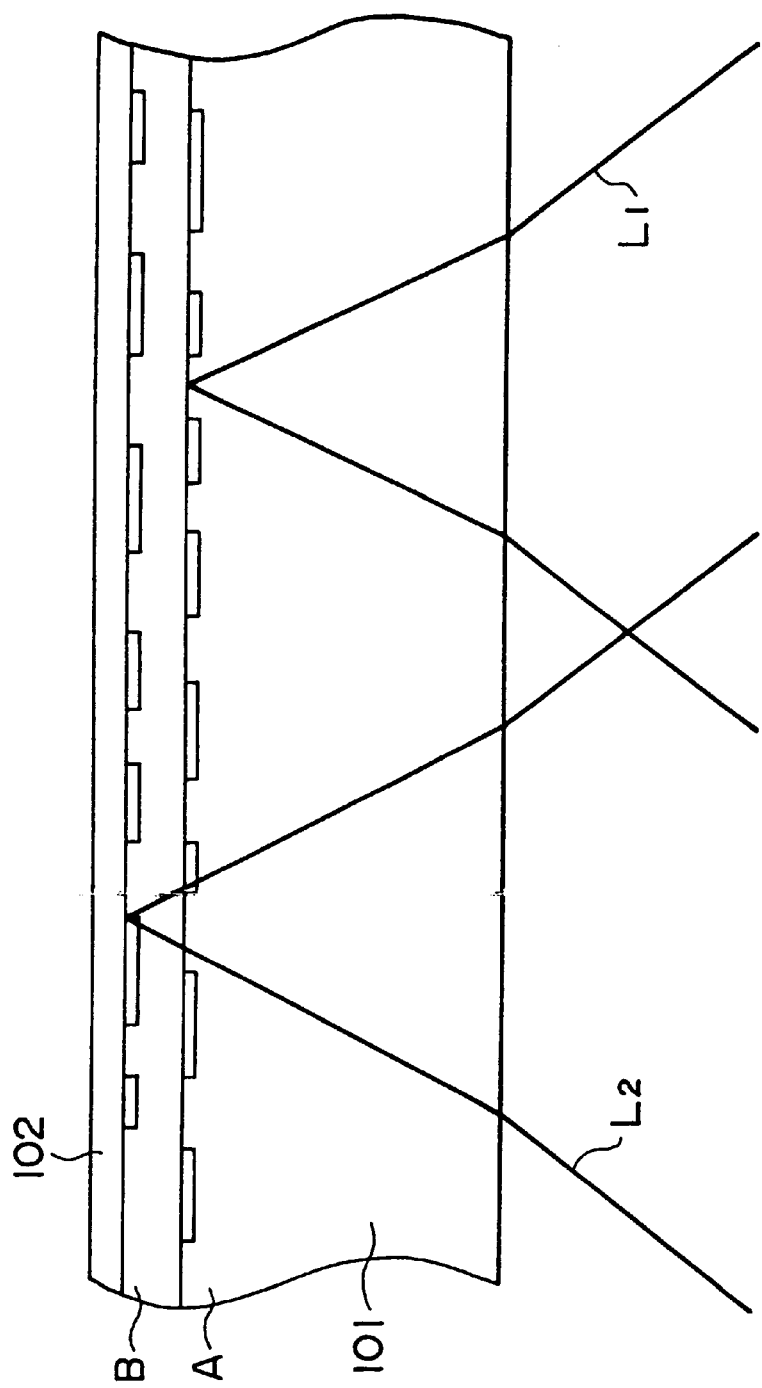

SYSTEM FOR PERFORMING FOCUSING OPERATION WHEN RECORDING AND/OR REPRODUCING DATA ON MULTILAYERED OPTICAL DISKS

This application is a division of application Ser. No. 08/662,492, filed Jun. 13, 1996 now U.S. Pat. No. 5,751,675.

BACKGROUND OF THE INVENTION

This invention relates to a recording and/or reproduction apparatus and a recording and/or reproduction method, and more particularly to a recording and/or reproduction apparatus and a recording and/or reproduction method wherein focusing control can be performed rapidly and with certainty upon an optical disk having two or more record layers.

An optical disk as represented by a compact disk has only one information record layer. In recent years, it is demanded to increase the recording capacity. Such increase in capacity can be achieved, for example, by decreasing the track pitch or by reducing the pit size. Also an optical disk of a different type has been proposed wherein it has a plurality of record layers formed therein in order to further increase the capacity.

FIG. 21 shows an exemplary construction of an optical disk of the type just mentioned. Referring to FIG. 21, in the optical disk shown, a record layer A is formed on a disk base plate 101, and another record layer B is formed on the record layer A. A protective film 102 is formed on the record layer B.

The disk base plate 101 is made of a transparent material such as, for example, polycarbonate. The record layer A is formed from a translucent film while the record layer B is formed from a total reflection film of, for example, aluminum or a like metal.

In order to reproduce information from the record layer A, a laser beam is focused on the record layer A as denoted by reference character $L_1$, and reflected light from the record layer A is detected.

On the other hand, in order to reproduce information recorded on the record layer B, a laser beam is focused upon the record layer B through the record layer A formed from a translucent film as denoted by reference character $L_2$. Then, reflected light from the record layer B is received through the record layer A and detected. In this manner, since the record layer A is formed from a translucent film, information of the record layer B can be read through the record layer A.

In order to change, while a laser beam is focused upon the record layer A (or the record layer B), the record layer as an object of reproduction to the record layer B (or the record layer A), jump pulses should be applied to a focusing servo loop to cause the optical head to jump toward the new record layer and then focusing servo should be applied so that the focusing error signal may be minimized on the new record layer.

However, the position at which the focusing error signal exhibits a minimum value is not necessarily an accurate focus position because of a dispersion of the optical head or the disk in production or from some other cause. Therefore, normally an offset signal is added to the focusing error signal so that an optimum focusing condition can be obtained.

However, in the related art apparatus, the offset value is fixed irrespective of from which one of record layers information is reproduced. Accordingly, the related art apparatus has a subject to be solved in that it is difficult to reproduce information stably from a plurality of record layers.

SUMMARY OF THE INVENTION

It is an object of the present invention to provide a recording and/or reproduction apparatus and a recording and/or reproduction method by which information can be recorded or reproduced accurately onto or from any of a plurality of record layers of an optical disk.

In order to attain the object described above, according to an aspect of the present invention, there is provided a recording and/or reproduction apparatus for an optical record medium, which comprises an optical means for recording and/or reproducing information onto and/or from the record medium, a focusing control means for controlling a focus condition of the optical means in response to a focus error signal, a production means for producing a focus offset signal of the optical means based on a signal reproduced by the optical means, and an addition means for adding the focus offset signal to the focus error signal. Preferably, the production means includes a search means for searching for an optimum focus offset position based on the signal reproduced by the optical means.

In the recording and/or reproduction apparatus., the optical means records and/or reproduces information onto and/or from the record medium, and the focusing control means controls a focus condition of the optical means in response to a focus error signal. Then, the production means produces a focus offset signal of the optical means based on a signal reproduced by the optical means, and the addition means adds the focus offset signal to the focus error signal. In order for the production means to produce a focus offset signal, the search means thereof searches for an optimum focus offset position based on the signal reproduced by the optical means.

With the recording and/or reproduction apparatus, since an optimum focus offset position of light for recording or reproducing information onto or from the record medium is searched for and a focus offset signal of the optical means is added to a focus error signal in response to a result of the search, to or from whichever one of a plurality of record layers of the record medium information is to be recorded or reproduced, an optimum focusing condition can normally be realized irrespective of a dispersion or a variation with respect to time of the record medium.

According to another aspect of the present invention, there is provided a recording and/or reproduction method for an optical record medium, which comprises the steps of recording and/or reproducing information onto and/or from the record medium by optical means, producing a focus error signal, producing a focus offset signal of the optical means based on a signal reproduced by the optical means, adding the focus offset signal to the focusing error signal, and controlling a focusing condition of the optical means based on the focus error signal to which the focus offset signal is added. Preferably, the step of producing a focus offset signal includes the step of searching for an optimum focus offset position based on the signal reproduced by the optical means.

In the recording and/or reproduction method, information is recorded onto and/or reproduced from the record medium by the optical means, and a focus error signal is produced. Then, a focus offset signal of the optical means is produced based on a signal reproduced by the optical means, and the focus offset signal is added to the focusing error signal. Then, a focusing condition of the optical means is controlled based on the focus error signal to which the focus offset signal is added. In order to control the focusing condition of the optical means, an optimum focus offset position is searched for based on the signal reproduced by the optical means.

With the recording and/or reproduction method, since an optimum focus offset position of light for recording or reproducing information onto or from the record medium is searched for and a focus offset signal of the optical means is added to a focus error signal in response to a result of the search, to or from whichever one of a plurality of record layers of the record medium information is to be recorded or reproduced, an optimum focusing condition can normally be realized irrespective of a dispersion or a variation with respect to time of the record medium.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 21 is a sectional view showing an exemplary structure of a two-layer optical disk.

DESCRIPTION OF THE PREFERRED EMBODIMENTS

Figure 1:
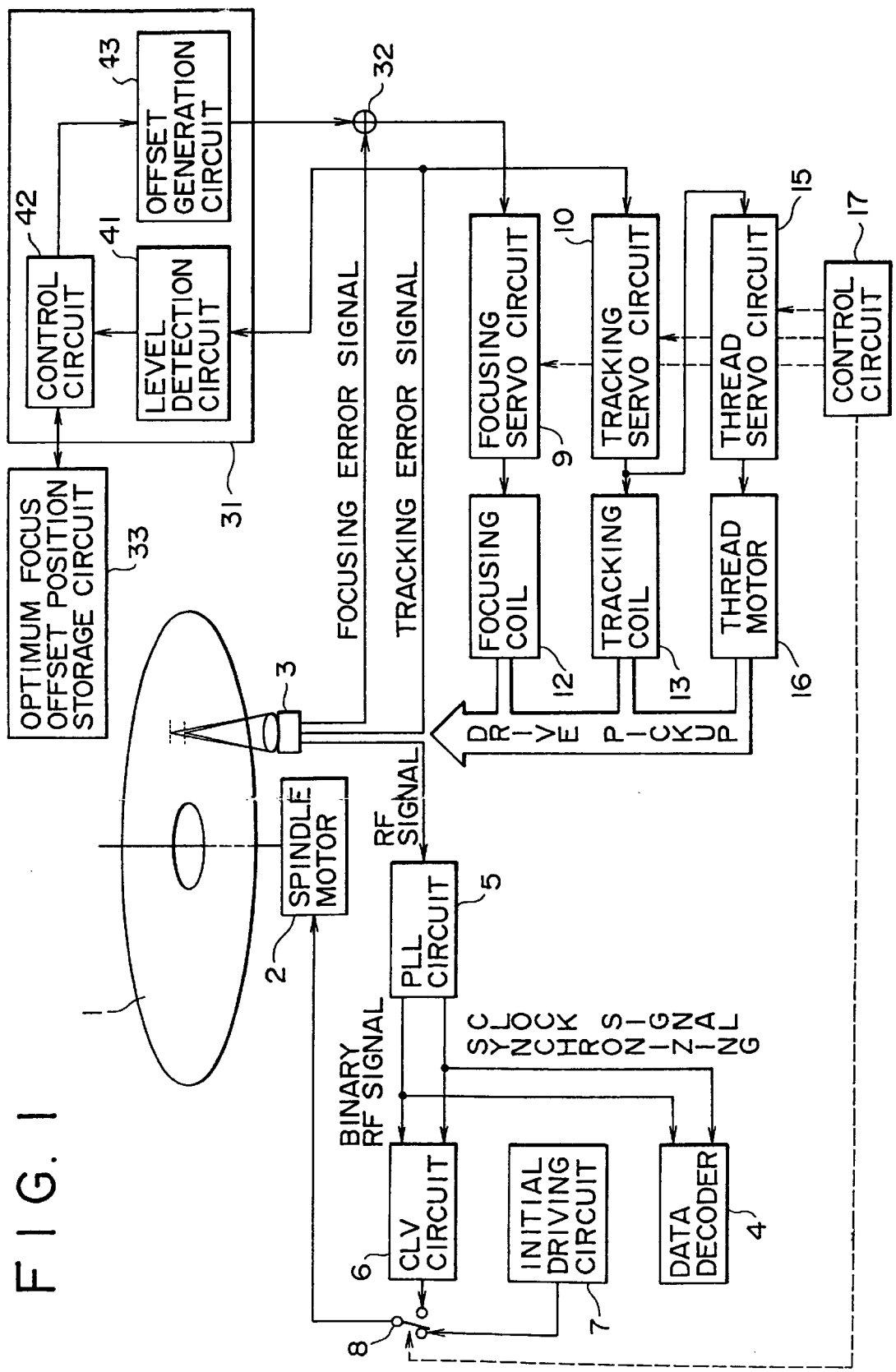
FIG. 1 is a block diagram showing an optical disk reproduction apparatus in which a recording and/or reproduction apparatus according to the present invention is incorporated.

Referring first to FIG. 1, there is shown a reproduction apparatus for an optical disk in which a recording and/or reproduction apparatus of the present invention is incorporated. Referring to FIG. 1, an optical disk 1 has a plurality of (2 or more) record (recording/recordable/recorded) layers. Where the optical disk 1 has two layers, it has such a construction as described hereinabove with reference to FIG. 21.

The optical disk 1 is rotated at a predetermined speed by a spindle motor 2. An optical head 3 irradiates a laser beam upon the optical disk 1 and receives reflected light from the optical disk 1.

A PLL (phase locked loop) circuit 5 binary digitizes a RF (radio frequency) signal reproduced from a signal recorded on the optical disk 1 by and outputted from the optical head 3 to produce a binary RF signal and extracts clocks included in the RF signal to produce a synchronizing clock signal. A CLV (constant linear velocity) circuit 6 receives the binary RF signal and the synchronizing clock signal outputted from the PLL circuit 5 and outputs an error signal representing an error in phase between them. A switch 8 is controlled by a control circuit 17 to select one of the output of the CLV circuit 6 and the output of an initial driving circuit 7 and outputs the selected output to the spindle motor 2.

A data decoder 4 receives the binary RF signal and the synchronizing clock signal outputted from the PLL circuit 5 and decodes the binary RF signal with reference to the synchronizing clock signal.

The optical head 3 produces a focusing error signal in accordance with, for example, a principle of an astigmatism method and further produces a tracking error signal in accordance with, for example, a principle of a push-pull method. A focusing servo circuit 9 receives the focusing error signal outputted from the optical head 3 and drives a focusing coil 12 in response to the focusing error signal to perform focusing control of the optical head 3 in a direction perpendicular to (toward or away from) the optical disk 1. A tracking servo circuit 10 receives the tracking error signal outputted from the optical head 3 and drives a tracking coil 13 in response to the tracking error signal to perform tracking control of the optical head 3 in a direction perpendicular to the direction of a track of the optical disk 1.

A signal outputted from the tracking servo circuit 10 is supplied to a thread servo circuit 15. The thread servo circuit 15 drives a thread motor 16 in response to the received signal to move the optical head 3 in a radial direction of the optical disk 1. The control circuit 17 controls the focusing servo circuit 9, the tracking servo circuit 10 and the thread servo circuit 15 as well as the switch 8.

The reproduction apparatus further includes a tracking error signal maximum amplitude search circuit 31. The tracking error signal maximum amplitude search circuit 31 includes a level detection circuit 41 which detects the level of the tracking error signal outputted from the optical head 3 and outputs a result of the detection to a control circuit 42. The control circuit 42 detects an optimum focus position of the optical head 3 from the output of the level detection circuit 41.

Figure 2:
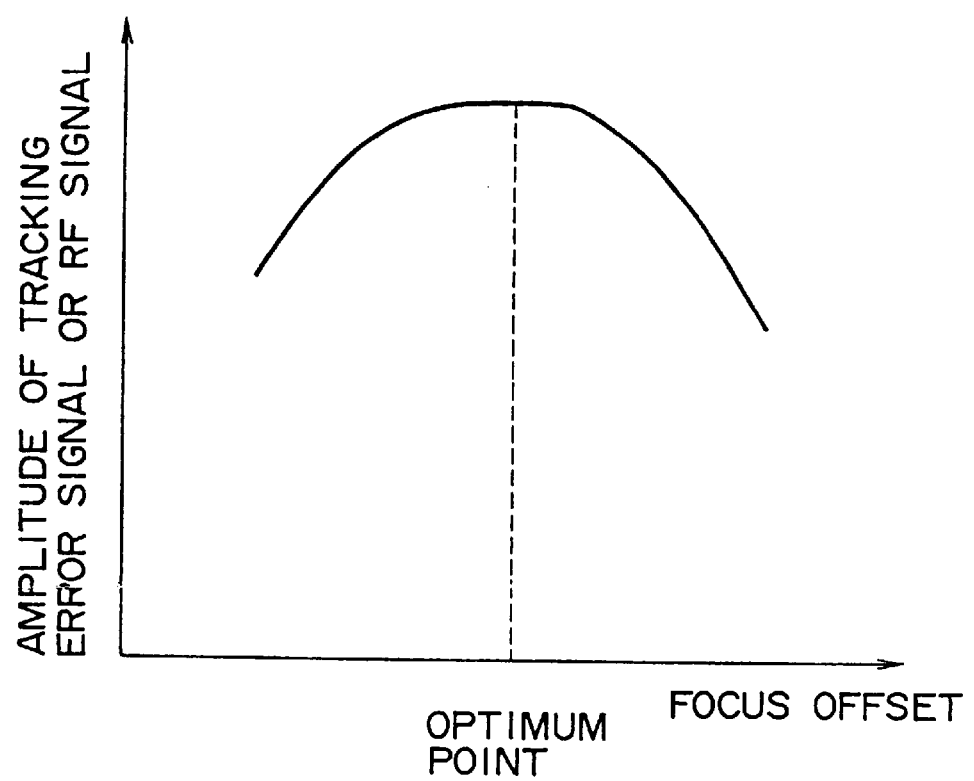
FIG. 2 is a graph illustrating a relationship between a focus offset and a tracking error signal.

When the focus offset position of the optical head 3 with respect to a record layer of the optical disk 1 is varied, the tracking error signal varies in such a manner as seen in FIG. 2. In particular, when the position of the optical head 3 is adjusted to an optimum focus offset position (optimum point), the tracking error signal exhibits a maximum amplitude, but if the position of the optical head 3 is displaced from the optimum point, then the amplitude of the tracking error signal decreases. The control circuit 42 detects an optimum point in accordance with this principle.

In order to detect an optimum point, the control circuit 42 controls an offset generation circuit 43 to generate an offset signal of a predetermined value. The offset signal is added to the focusing error signal outputted from the optical head 3 by an adder 32. The output of the adder 32 is outputted to the focusing servo circuit 9.

An optimum focus offset position storage circuit 33 is connected to the control circuit 42 of the tracking error signal maximum amplitude search circuit 31. Data of optimum focus offset positions obtained by searching of the tracking error signal maximum amplitude search circuit 31 are stored in the optimum focus offset position storage circuit 33.

Figure 3:
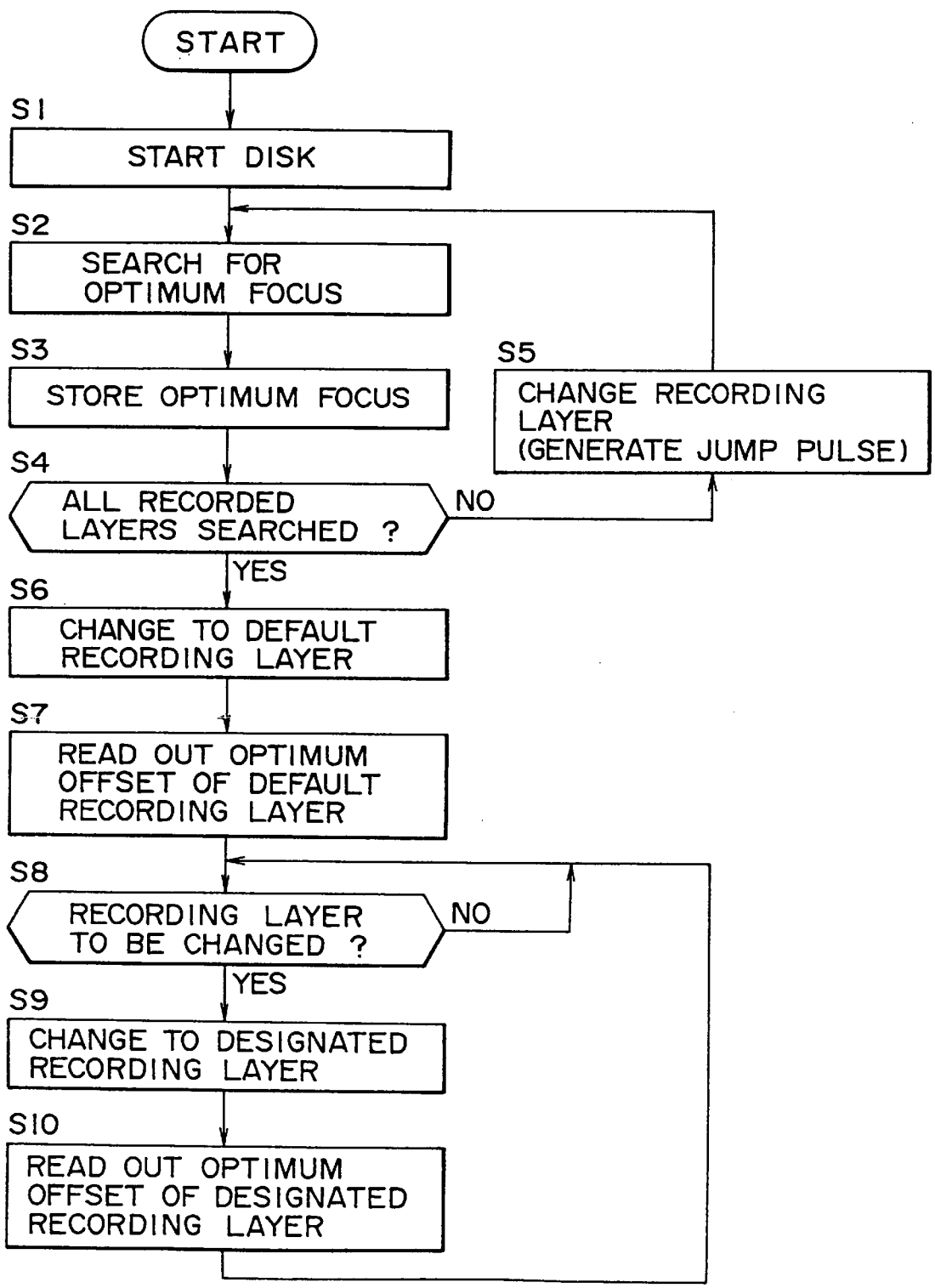
FIG. 3 is flow chart illustrating operation of the optical disk reproduction apparatus of FIG. 1.

FIG. 3 illustrates operation of the reproduction apparatus of FIG. 1. Referring to FIG. 3, first in step S1, disk starting processing is executed. In particular, when the optical disk 1 is loaded in position into the reproduction apparatus, the control circuit 17 controls the thread servo circuit 15 to drive the thread motor 16 to move the optical head 3 to a predetermined reference position of the optical disk 1 such as, for example, the position of an innermost circumferential track. Further, the control circuit 17 changes over the switch 8 to the initial driving circuit 7 side so that an initial driving signal outputted from the initial driving circuit 7 is supplied to the spindle motor 2 via the switch 8. Consequently, the spindle motor 2 is driven to rotate in response to the initial driving signal.

Further, the control circuit 17 controls the focusing servo circuit 9 to perform a focusing servoing operation. The optical head 3 irradiates a laser beam upon a default record layer (for example, the record layer A in FIG. 21) of the optical disk 1 and receives reflected light of the laser beam from the optical disk 1 to produce a focusing error signal and a tracking error signal. The focusing error signal is supplied to the focusing servo circuit 9 via the adder 32. The focusing servo circuit 9 drives the focusing coil 12 in response to the focusing error signal to control the position of the optical head 3 in the focusing direction.

The PLL circuit 5 receives a RF signal from the optical head 3 when the optical head 3 reproduces a signal recorded in the record layer A of the optical disk 1. The PLL circuit 5 binary digitizes the received RF signal to produce a binary RF signal and produce a synchronizing clock signal synchronized with a synchronizing signal included in the RF signal. The CLV circuit 6 compares the synchronizing clock signal with the binary RF signal in phase and outputs an error signal representing an error between them. The control circuit 17 changes over the switch 8 to the CLV circuit 6 side when a predetermined time elapses after the spindle motor 2 is started or when the speed of rotation of the spindle motor 2 reaches a predetermined speed. Consequently, the error signal outputted from the CLV circuit 6 is supplied to the spindle motor 2, and CLV servoing is performed with the error signal. As a result, the optical disk 1 is driven to rotate in a fixed linear velocity.

Then, the control sequence advances to step S2, in which optimum focus searching processing is executed. While the optimum focus searching processing is hereinafter described, the control circuit 42 of the tracking error signal maximum amplitude search circuit 31 controls the offset generation circuit 43 so that a predetermined offset signal is added to the focusing error signal by the adder 32. When the focusing condition is not appropriate, the amplitude of the tracking error signal outputted from the optical head 3 is small, but when the focusing condition is in an optimum condition, the amplitude of the tracking error exhibits a maximum value. Therefore, the amplitude of the tracking error signal is detected by the level detection circuit 41, and it is discriminated by the control circuit 42 whether or not a tracking error signal of a maximum amplitude has been obtained. If it is discriminated that a tracking error signal of a maximum amplitude has been obtained, then an offset value which is generated by the offset generation circuit 43 then is detected.

Then, the control sequence advances to step S3, in which the optimum focus offset value obtained in step S2 is stored into the optimum focus offset position storage circuit 33.

After an optimum focus offset position in one record layer (for example, the record layer A in FIG. 21) is detected, the control sequence advances to step S4, in which it is discriminated whether or not similar searching has been performed for all of the record layers of the optical disk 1. If searching has not been performed for all of the record layers, the control sequence advances to step S5, in which record layer changing processing is executed. In particular, the control circuit 17 controls the focusing servo circuit 9 so that jump pulses are added to the focusing error signal (or jump pulses are generated in place of the focusing error signal). As a result, the focusing coil 12 moves the optical head 3 in the focusing direction in response to the jump pulses so that the laser beam having been focused upon the record layer A till then is focused now on the record layer B. After the supply of the jump pulses is stopped, the ordinary focusing servo loop is put into a closed condition again to apply servoing so that the focusing error may be minimized thereby to focus the laser beam generated by the optical head 3 now upon the record layer B.

Thereafter, the control sequence returns to step S2 to perform optimum focus searching processing for the record layer B. Then, an optimum focusing offset value obtained by the optimum focus searching processing is stored into the optimum focus offset position storage circuit 33 in step S3.

Where N record layers are formed in the optical disk 1, N optimum focus offset values are stored into the optimum focus offset position storage circuit 33 in such a manner as described above.

After optimum focus offset values (positions) of all of the record layers of the optical disk 1 are stored, the control sequence advances from step S4 to step S6, in which the focusing position is changed to the default record layer set in advance. For example, the control circuit 17 controls the focusing servo circuit 9 to generate a required number of jump pulses to focus the laser beam upon the record layer A nearest to the disk base plate 101.

In this instance, in step S7, the control circuit 42 of the tracking error signal maximum amplitude search circuit 31 reads the focus offset value for the record layer A stored in the optimum focus offset position storage circuit 33 and supplies it to the offset generation circuit 43. The offset generation circuit 43 generates an offset signal corresponding to the offset value. The offset signal is added to the focusing error signal by the adder 32 and supplied to the focusing servo circuit 9. The focusing coil 12 is driven by the focusing servo circuit 9 with the focusing error signal to which the optimum offset value is added. Consequently, an optimum focusing condition is realized in the record layer A.

Then, the control sequence advance to step S8, in which it is waited that changing of the record layer to be reproduced is instructed. When changing of the record layer is instructed, the control sequence advances to step S9, in which the focus position is changed to the designated record layer. In particular, in this instance, the control circuit 17 controls the focusing servo circuit 9 to generate a predetermined number of jump pulses to change the focus position, for example, from the record layer A to the record layer B.

Thereafter, in step S10, reading out processing of an optimum-offset value of the designated record layer is executed. In particular, the control circuit 42 of the tracking error signal maximum amplitude search circuit 31 reads out the offset value for the record layer B stored in the optimum focus offset position storage circuit 33 and outputs it to the offset generation circuit 43. The offset generation circuit 43 generates an offset signal corresponding to the offset value. The offset signal is added to the focusing error signal by the adder 32. The focusing servo circuit 9 drives the focusing coil 12 in response to the output of the adder 32 so that an optimum focus condition is realized in the record layer B (a focus condition wherein the amplitude of the tracking error signal exhibits a maximum value is realized).

Thereafter, the control sequence returns to step S8 so that the succeeding processing in steps S8 et seq. is executed repetitively.

Figure 4:
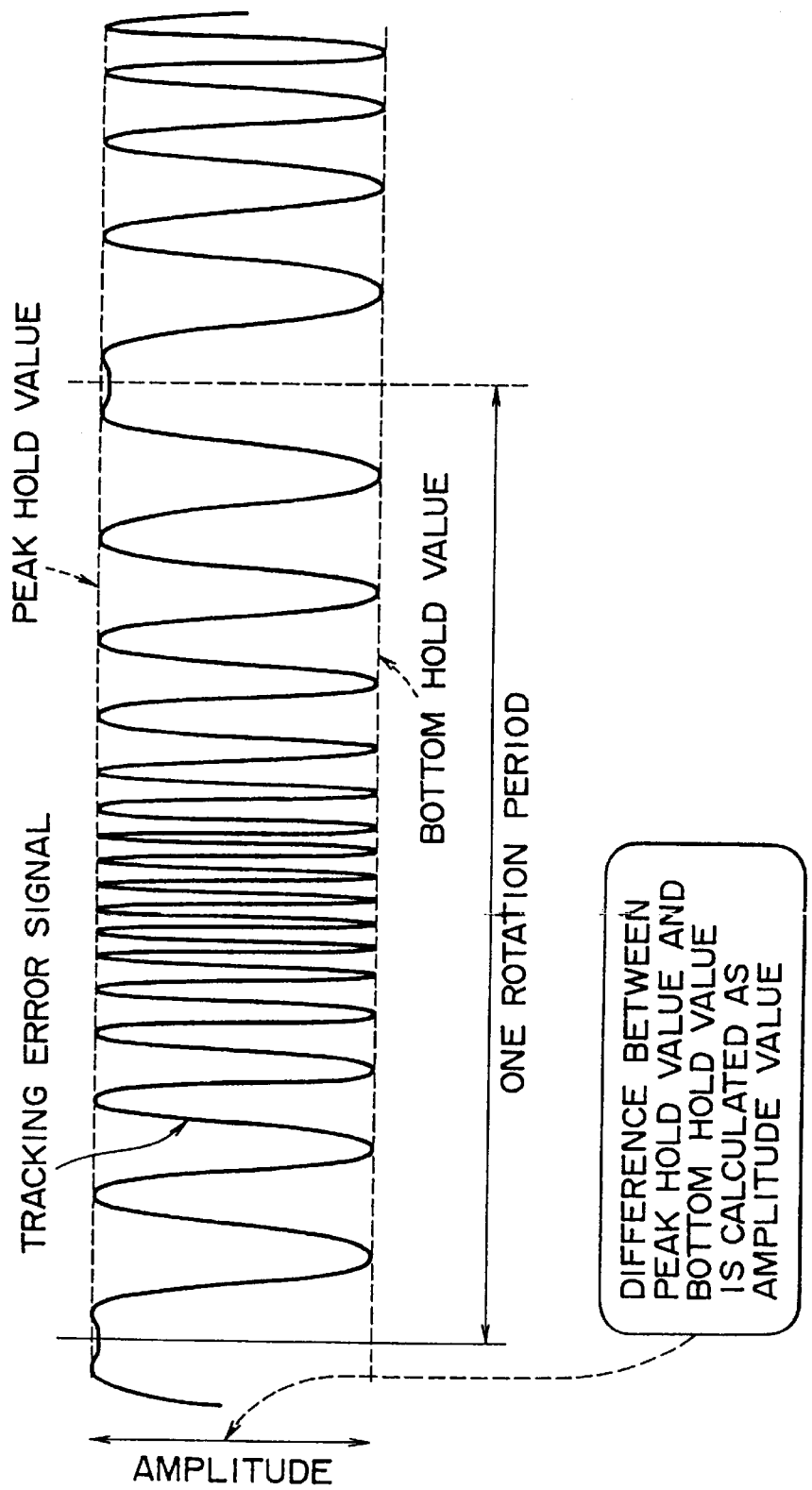
FIG. 4 is a waveform diagram showing a waveform of a tracking error signal upon initial operation of the optical disk reproduction apparatus of FIG. 1.

Subsequently, optimum focus searching will be described. As described hereinabove, upon such searching, tracking servoing is not yet started. Consequently, the optical head 3 periodically crosses a plurality of tracks of the optical disk 1. In particular, since the centers of rotation of the optical disk 1 and the spindle motor 2 are displaced from each other due to eccentricity between them, the information reproduction point of the optical head 3 (a light spot of the laser beam) periodically crosses a plurality of tracks. As a result, the optical head 3 outputs, for example, such a tracking error signal as shown in FIG. 4. As seen in FIG. 4, the tracking error signal exhibits a periodical variation.

The level detection circuit 41 of the tracking error signal maximum amplitude search circuit 31 detects a peak hold value and a bottom hold value of the tracking error signal and detects a difference between them as an amplitude of the tracking error signal. The amplitude detection signal is supplied to the control circuit 42. The amplitude of the tracking error signal varies in response to the focus offset value of the optical head 3 as seen in FIG. 2. The control circuit 42 detects an optimum point of the focus offset with which a maximum amplitude of the tracking error signal is obtained by a so-called mountain-climbing method.

Figure 5:
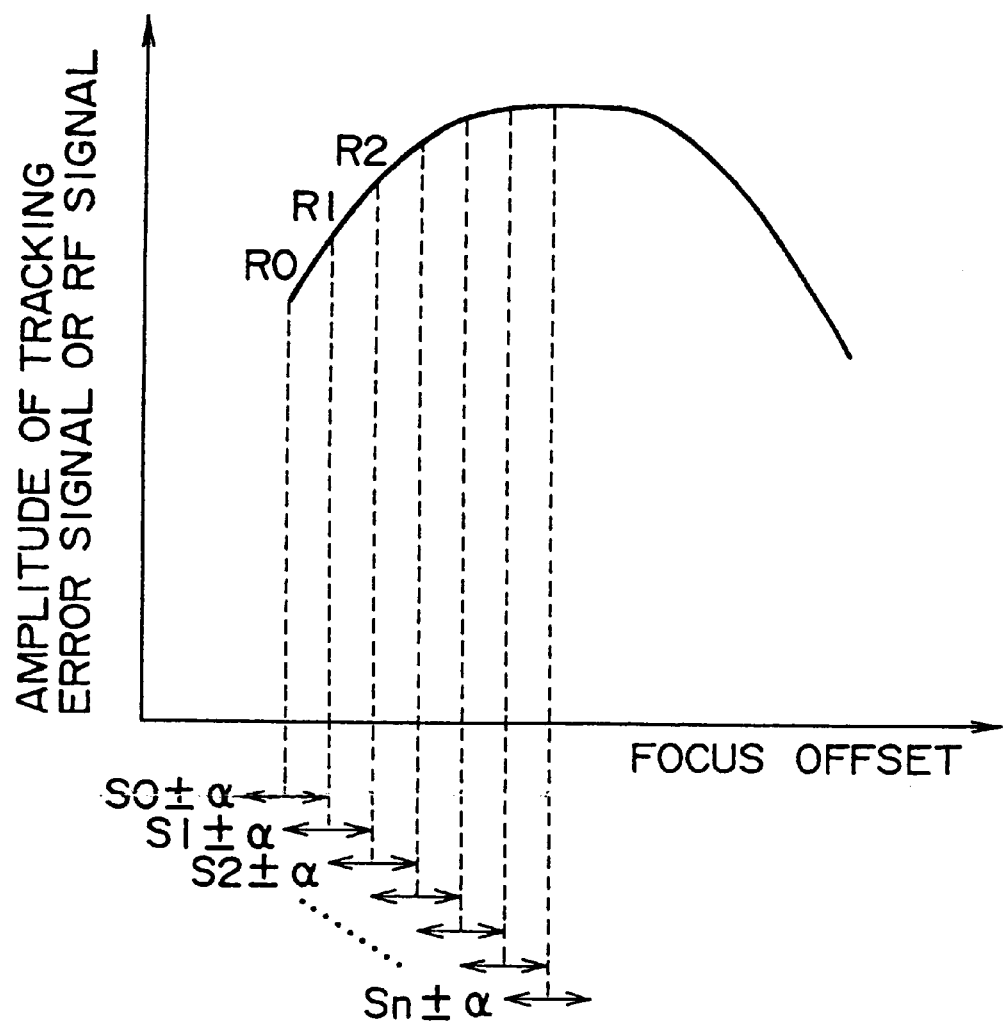
FIG. 5 is a graph illustrating a principle in detecting an optimum point of a focus offset by a mountain-climbing method.

In particular, referring to FIG. 5, the offset signal to be outputted from the offset generation circuit 43 is succes-
sively incremented by a value $\alpha$ like $S_0$, $S_1$, $S_2$, . . . Then, the amplitude values $R_{i-1}$, $R_i$ and $R_{i+1}$ of the tracking error signal at each three successive sampling points $S_{i-1}$, $S_i$ and $S_{i+1}$ are compared with each other. When the amplitude value $R_i$ exhibits the highest value among them ($R_{i-1} < R_i > R_{i+1}$), the sampling point $S_i$ is determined as an optimum point. To this end, the control circuit 42 controls the offset generation circuit 43 to output an offset value which first exhibits a predetermined initial value and thereafter successively varies by $\alpha$. The offset signal is added to the focusing error signal by the adder 32 and outputted to the focusing servo circuit 9.

Figure 6:
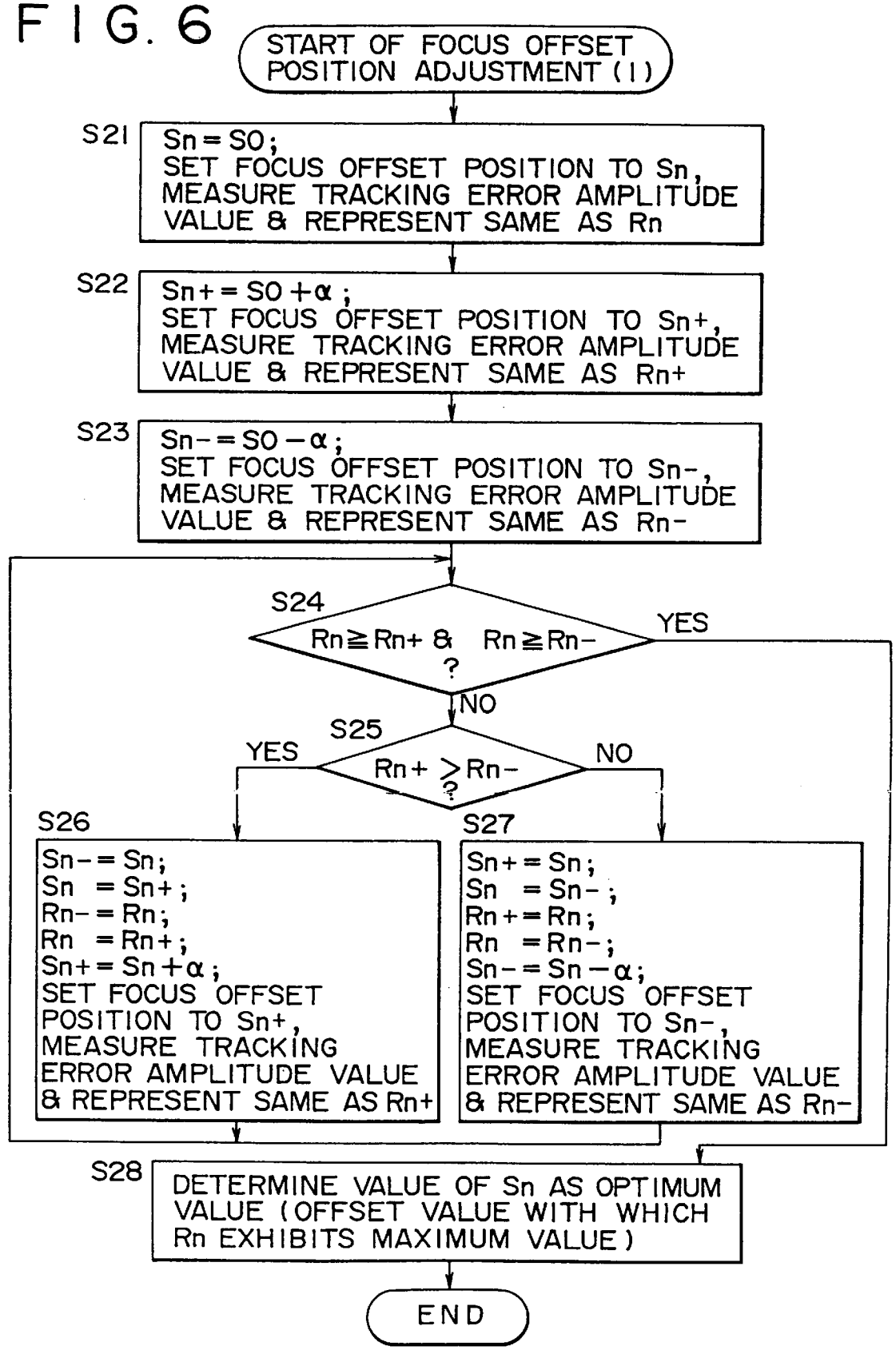
FIG. 6 is a flow chart illustrating processing of detecting an optimum point in accordance with the principle illustrated in FIG. 5.

FIG. 6 illustrates exemplary processing by the mountain-climbing method when the focus offset value is adjusted. Referring to FIG. 6, first in step S21, an initial value $S_0$ is placed into Sn. Then, the focus offset position is set to Sn (in this instance, Sn=$S_0$), and an amplitude value of the tracking error signal in this instance is measured. Then, a result of the measurement is set to Rn (in this instance, Rn=R0).

In particular, the control circuit 42 controls the offset generation circuit 43 to generate an offset signal $S_0$. The focusing servo circuit 9 controls the focusing coil 12 in response to the focusing error signal to which the offset signal $S_0$ is added by the adder 32 to adjust the focus offset of the optical head 3.

The level detection circuit 41 detects the amplitude of the tracking error signal outputted from the optical head 3 and outputs it to the control circuit 42. The control circuit 42 sets the amplitude value of the tracking error signal detected then to Rn (in this instance, Rn=R0).

Thereafter, the control sequence advances to step S22, in which a value obtained by addition of $S_0$ and $\alpha$ is placed into Sn+. In other words, the following equation is calculated:

$$Sn+=S_0+\alpha$$

Then, the control circuit 42 controls the offset generation circuit 43 to generate such offset signal Sn+(=$S_1$). In particular, the control circuit 42 controls the offset generation circuit 43 to generate an offset value which is higher by $\alpha$ than the offset signal Sn generated in step S21. Since the focusing servo circuit 9 controls the focusing coil 12 in response to the focusing error signal to which the offset value is added, the optical head 3 further varies the focus offset thereof by an amount corresponding to the offset value $\alpha$.

The level detection circuit 41 detects the amplitude of the tracking error signal outputted from the optical head 3 then. The control circuit 42 sets the amplitude of the tracking error signal detected by the level detection circuit 41 then to Rn+ (in this instance, R0+=$R_1$).

Then, the control sequence advances to step S23, in which a value lower by $\alpha$ than $S_0$ is placed into Sn-. In other words, the following equation is calculated:

$$Sn-=S_0-\alpha$$

In particular, the control circuit 42 controls the offset generation circuit 43 to generate a value lower by $\alpha$ than the offset signal Sn (in this instance, Sn=$S_0$) generated in step S2. Since the focusing error signal to which the offset signal Sn- is added is supplied to the focusing coil 12 via the focusing servo circuit 9, the focus offset of the optical head 3 is varied by an amount corresponding to the offset value $-\alpha$ from that when the offset value $S_0$ was generated.

Then, the level detection circuit 41 thereupon detects the amplitude of the tracking error signal outputted from the optical head 3 and outputs it to the control circuit 42. The control circuit 42 places the amplitude value of the tracking error signal then into Rn−(in this instance, Rn−=R$_0$−).

By the processing in steps S21 to 23 described above, the amplitude value Rn (=R$_0$) of the tracking error signal when the offset value to be added to the focusing error signal is set to the initial value S$_0$, the amplitude value Rn+(=R$_0$+=R$_1$) of the tracking error signal when the offset signal is increased by α and the amplitude value Rn−(=R$_0$−) when the offset signal is decreased by α are obtained as illustrated in FIG. 5.

Thereafter, the control sequence advances to step S24, in which it is discriminated whether or not Rn is equal to Rn+ or Rn is higher than Rn+ and equal to Rn− or else Rn is higher than Rn−. In other words, it is discriminated whether or not Rn is higher than Rn− and Rn+(that is, whether or not Rn is the highest value).

Normally, as shown in FIG. 5, the amplitude Rn (=R$_0$) of the tracking error signal when the offset signal is S$_0$ is higher than the amplitude value Rn−(=R$_0$−) when the offset signal is lower by α, but is lower than the amplitude Rn+(=R$_0$+=R$_1$) of the tracking error signal when the offset signal is higher by α. Therefore, in this instance, the control sequence advances to step S25, in which it is discriminated whether or not Rn+ is higher than Rn−. In this instance, since Rn+(=R$_0$+=R$_1$) is higher than Rn−(=R$_0$−) (since the values are within a section of the curve of FIG. 5 within which the curve exhibits a rightwardly ascending slope in FIG. 5), the control sequence advances to step S26.

In step S26, Sn (=S$_0$) till then is placed into Sn−. Then, Sn+(=S$_1$) till then is placed into new Sn, and Rn (=R$_0$) till then is placed into Rn−, and then Rn+(=R$_1$) till then is placed into Rn. Then, a value (=S$_0$+2α=S$_2$) obtained by adding α to new Sn (=S$_0$+α=S$_1$) is placed into Sn+. In other words, the following equation is calculated:

$$Sn+ = Sn + \alpha$$

The control circuit 42 controls the offset generation circuit 43 to generate Sn+(=S$_2$) as an offset signal. In other words, the control circuit 42 controls the offset generation circuit 43 to generate an offset Sn+(=S$_0$+2α=S$_2$) higher by α than Sn+(=S$_0$+α) generated in step S22. Then, the amplitude of the tracking error signal detected then is placed into Rn+(=R$_1$+=R2).

In other words, as a result, the amplitude values of the tracking error signal at the three sampling points S$_0$, S$_1$ and S$_2$, which have been shifted rightwardly by α from those till then in the condition shown in FIG. 5, are placed in Rn−(=R$_0$), Rn (=R$_1$) and Rn+(=R2).

Then, the control sequence returns to step S24, in which it is discriminated whether or not Rn is higher than Rn− and Rn+. When Rn is not the highest value, the control sequence advances to step S25, in which it is discriminated again whether or not Rn is higher than Rn−. When Rn+ is higher than Rn−, the control sequence advances to step S26, in which similar processing is repeated.

Then, if the section for sampling is shifted in the rightward direction in FIG. 5 until Sn comes to an optimum point, then the amplitude value Rn obtained then is higher than Rn− and besides higher than R+. In other words, Rn exhibits the highest value. Thus, in this instance, the control sequence advances to step S28, in which the value of Sn then is set as an optimum value with which the amplitude Rn of the tracking error signal exhibits a maximum value. In other words, the control circuit 42 thereafter controls the offset generation circuit 43 to continuously generate the offset signal Sn as the optimum value.

On the other hand, when sampling is proceeding in a section in which the curve in FIG. 5 exhibits a rightwardly descending slope, the value of Rn+ exhibits a value lower than Rn−. Thus, in this instance, the control sequence advances from step S25 to S27, in which Sn till then is placed into Rn+, Sn− till then is placed into Sn, Rn till then is placed into Rn+, and Rn− till then is placed into Rn. Then, a value lower by α than new Sn is placed into Sn−. In other words, the following equation is calculated:

$$Sn- = Sn - \alpha$$

In particular, referring to FIG. 5, the sampling point on the left side is sampled with Sn−. Then, the amplitude value of the tracking error signal when the offset signal Sn− is generated by the offset generation circuit 43 is detected. The thus detected amplitude value is placed into Rn−.

Then, the control sequence returns to step S24, in which it is discriminated whether or not Rn is higher than Rn− and Rn+. Since Rn is still lower than Rn− in the portion of the characteristic of the rightwardly descending slope in FIG. 5, the control sequence advances to step S25 and then from step S25 to step S27 to repeat similar processing. Then, when the sampling point successively advances in the leftward direction (toward an optimum point) in FIG. 5 until Sn reaches an optimum point, Rn exhibits a value higher than Rn+ and higher than Rn−. In this instance, the control sequence advances from step S24 to step S28, in which the value of the offset signal then is determined as an optimum value. Thereafter, the control circuit 42 controls the offset generation circuit 43 to successively generate the optimum value.

Figure 7:
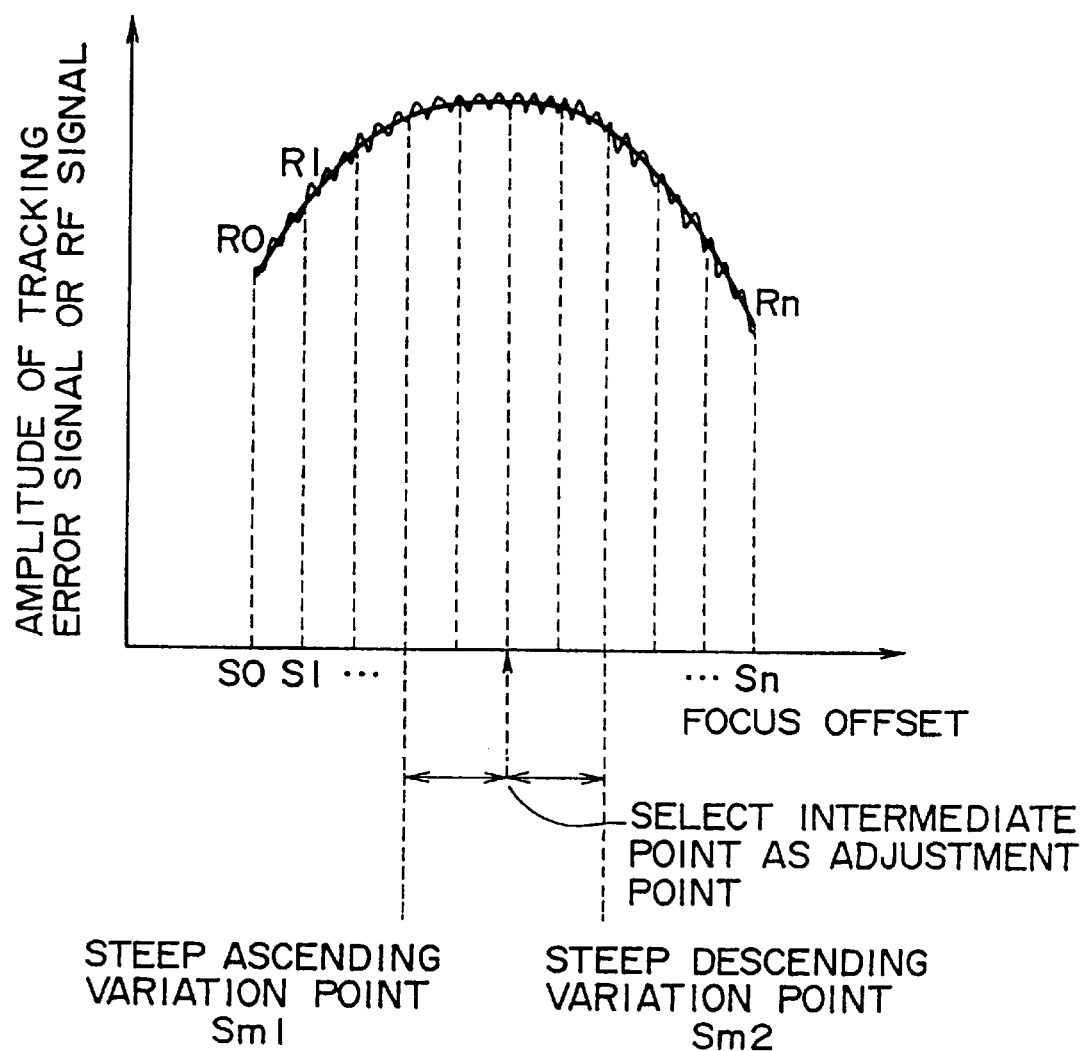
FIG. 7 is a graph illustrating a principle in detecting an optimum point from a sudden ascending variation point and a sudden descending variation point.

While, in the description above, an optimum point (maximum value) is detected by the so-called mountain-climbing method, the optimum point may be determined otherwise in such a manner as illustrated, for example, in FIG. 7. In particular, in the method illustrated in FIG. 7, the offset signal is successively varied by α to sample the tracking error signal for the entire period from S$_0$ to Sn first. Then, in this instance, the offset signal which corresponds to a point of a sudden ascending variation of the tracking error signal obtained by the sampling is detected as Sm$_1$ whereas the offset signal which corresponds to a point of a sudden descending variation of the tracking error signal is detected as Sm$_2$. Then, a middle point between the variation points Sm$_1$ and Sm$_2$ is determined as an optimum point (adjustment point).

Figure 8:
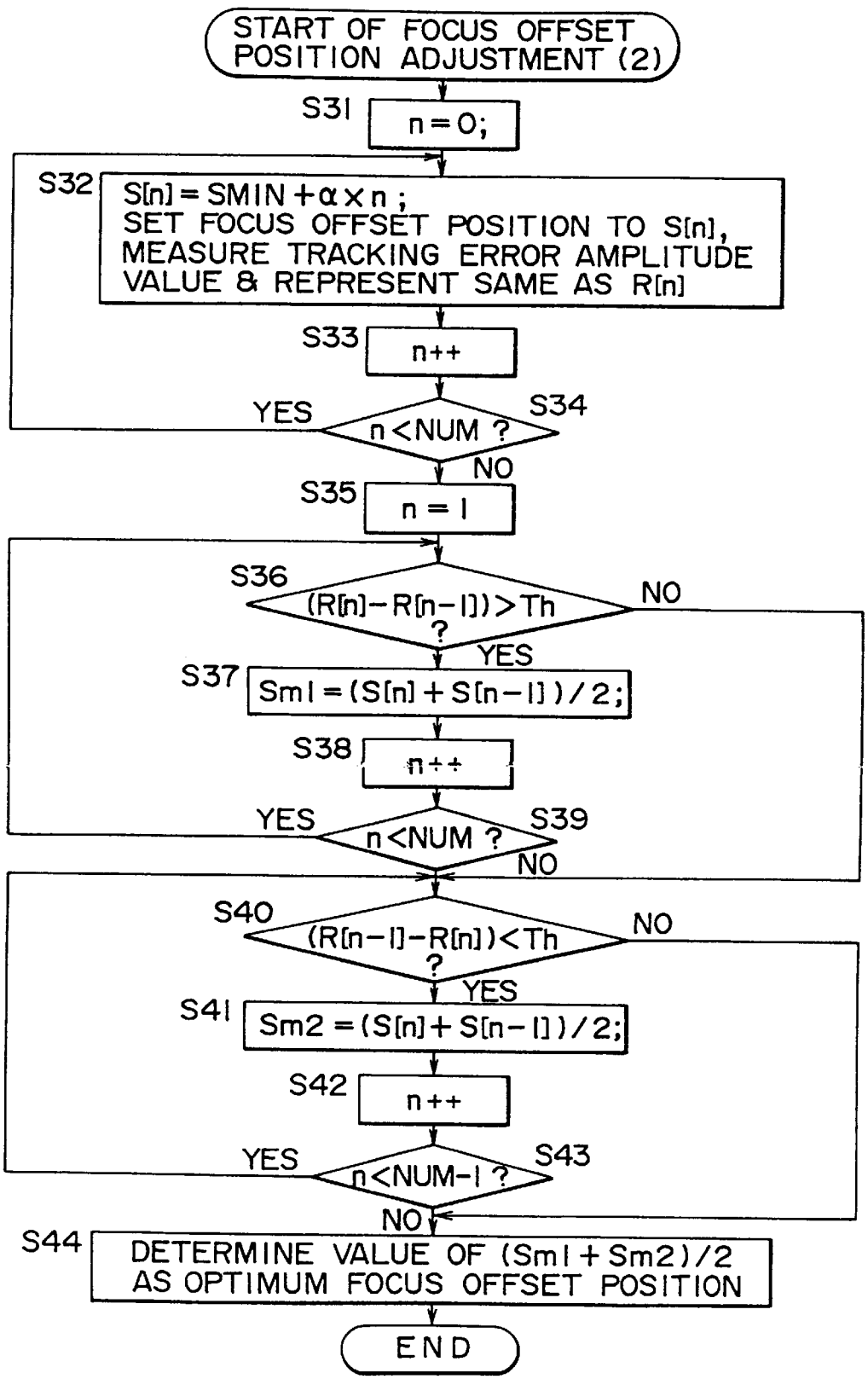
FIG. 8 is a flow chart illustrating processing of detecting an optimum point in accordance with the principle illustrated in FIG. 7.

FIG. 8 illustrates an example of processing when an optimum point is detected based on the method illustrated in FIG. 7. In the processing illustrated in FIG. 8, first in step S31, a variable n is initially set to 0, and in step S32, the following equation is calculated:

$$S[n] = SMIN + \alpha \times n$$

where SMIN is the minimum value of the offset adjustment value, and α is the width or step size by which the offset signal is varied stepwise.

In the present case, since n=0, S[0] is placed into SMIN. The control circuit 42 controls the offset generation circuit 43 to generate the value S[n] (in the present case S[0]=SMIN). Thereafter the amplitude of the tracking error signal then is detected by the level detection circuit 41. The value thus detected is placed into R[n] (=R[0]).

Then, the control sequence advances to step S33, in which the variable n is incremented by 1 (n is set to n=1). In step S34, it is discriminated whether or not the variable n after incremented is lower than NUM. The character NUM represents a value given, where a maximum value of the offset value is represented by SMAX, by (SMAX −SMIN)/α. In other words, NUM represents a sample number in the offset scanning range.

Where n is lower than NUM, since this signifies that sampling is not yet completed for all sampling points, the control sequence returns to step S32, in which the following equation is calculated:

$$S[n]=SMIN+\alpha \times n$$

In other words, in this instance, a value higher by α than SMIN is set as an offset signal S[1]. Then, the amplitude of the tracking error signal when the offset signal S[1] is generated is measured, and the thus measured value is set as R[1].

Thereafter, the control sequence advances to step S33, in which the variable n is incremented by one, in this instance, to n=2. When it is discriminated in step S34 that the variable n (=2) is lower than NUM, the control sequence returns to step S32 so that similar processing is executed repetitively. Amplitude values $R_0$ to $R_n$ of the tracking error signal at the sampling points of $S_0$ to $S_n$ shown in FIG. 7 are obtained in this manner.

When the sampling in the search range is completed in such a manner as described above, the variable n becomes equal to NUM. Consequently, the control sequence now advances from step S34 to step S35, in which the variable n is initialized to 1. Then, in step S36, it is discriminated whether or not the difference between the amplitude value R[n] at the current reference point and the preceding amplitude value R[n−1] is higher than a reference value Th set in advance. In the present case, it is discriminated whether or not the value of R[1]−R[0] is higher than Th. Since the curve in FIG. 7 exhibits a rightwardly descending characteristic within a first period of the sampling range as seen in FIG. 7, R[1] is sufficiently higher than R[0] (the difference (R[1]−R[0]) between them is higher than Th). Therefore, the control sequence advances to step S37, in which a middle value between the sampling points S[n] and S[n−1] is set as a variation point $Sm_1$. In other words, the following equation is calculated:

$$Sm_1=(S[n]+S[n-1])/2$$

In the present case, a middle point between S[1] and S[0] is set as $Sm_1$.

Thereafter, the control sequence advances to step S38, in which the variable n is incremented by 1 (to n=2), and then to step S39, in which it is discriminated whether or not the variable n is lower than NUM. When the variable n is lower than NUM, the control sequence returns to step S36, in which it is discriminated whether or not the value of R[2]−R[1] is higher than Th. As seen in FIG. 7, within a period within which the tracking error signal exhibits a great variation, the difference between two sample values is higher than the reference value Th. Thus, the control sequence advances again to step S37, in which $Sm_1$ is set to the value of (S[2]+S[1])/2. In other words, α value at the sample point spaced rightwardly by α from the preceding sample point is set as $Sm_1$.

Then, in step S38, the variable n is incremented by 1 again to n=3, whereafter the control sequence returns from step S39 to step S36 to execute similar processing repetitivey.

Then, as the sampling point moves rightwardly in FIG. 7, the rate of change of the tracking error signal degreases gradually. Then, when it is discriminated that the value of R[n]−R[n−1] is lower than Th, the control sequence advances from step S36 to step S40. In other words, in this instance, a point of variation at which the rate of change of the amplitude of the tracking error signal changes from a section in which it is high to another section in which it is low (a sudden ascending variation point) is set as $Sm_1$.

In steps S40 et seq., a point of variation at which the rate of change of the amplitude of the tracking error signal changes from a section in which it exhibits a gradual decrease to another section in which it exhibits a sudden decrease is detected as a sudden descending variation point $Sm_2$.

To this end, in step S40, it is discriminated whether or not the value of R[n−1]−R[n] is lower than the reference value Th. As seen from FIG. 7, within a period within which the sample value R[n−1] on the left side is lower than the sample value R[n] on the right side (within a period within which the curve exhibits a rightwardly ascending slope) as well as within a period within which the sample value R[n] on the right side is lower than the sample value R[n−1] on the left side but the difference between them is small, the value of R[n−1] is lower than the reference value Th. Consequently, the control sequence advances from step S40 to step S41, in which a middle value between S[n] and S[n−1] is set as $Sm_2$. In other words, the following equation is calculated:

$$Sm_2=(S[n]+S[n-1])/2$$

Then, n is incremented by 1 in step S42, and in step S43, it is discriminated whether or not the variable n is lower than NUM−1 (whether or not the search range has reached the right end in FIG. 7). When the variable n is lower then NUM−1, the control sequence returns to step S40, in which similar processing is repeated for two sample values on the right side shifted by one sample distance in FIG. 7. Then, when the difference between the two sample values is lower than the reference value Th, the control sequence advances again to step S41, in which a middle value between the two sampling points is set as $Sm_2$.

When the sampling point is successively shifted in the rightward direction in FIG. 7 in this manner until the sample value R[n] on the right side in FIG. 7 exhibits a sudden decrease from the sample value R[n−1] on the left side, the difference between them (R[n−1]−R[n]) becomes equal to or higher than the reference value Th. In this instance, a middle value between the sample points S[n−1] and S[n−2] is placed into $sm_2$. Thus, the value then is determined as a sudden descending variation point $Sm_2$.

Since the sudden ascending variation point $Sm_1$ has been determined in step S37 and the sudden descending variation point $Sm_2$ has been determined in step S41 in such a manner as described above, the control sequence now advances to step S44, in which a middle point between the variation points $Sm_1$ and $Sm_2$ is determined as an optimum point. In other words, the value of $(Sm_1+Sm_2)/2$ is set as an optimum point.

It is to be noted that, when it is discriminated in step S39 that the variable n is equal to or higher than NUM, the control sequence advances from step S39 to step S40. On the other hand, when it is discriminated in step S43 that the variable n is equal to or higher than NUM−1, the control sequence advances from step S43 to step S44.

While, in the operation of the reproduction apparatus illustrated in FIG. 3, when the optical disk 1 is loaded in position into the reproduction apparatus, optimum focus offset position of all record layers of the optical disk 1 are searched out and stored in advance, it is otherwise possible to search for an optimum focus offset position each time the object record layer for focusing is changed.

Figure 9:
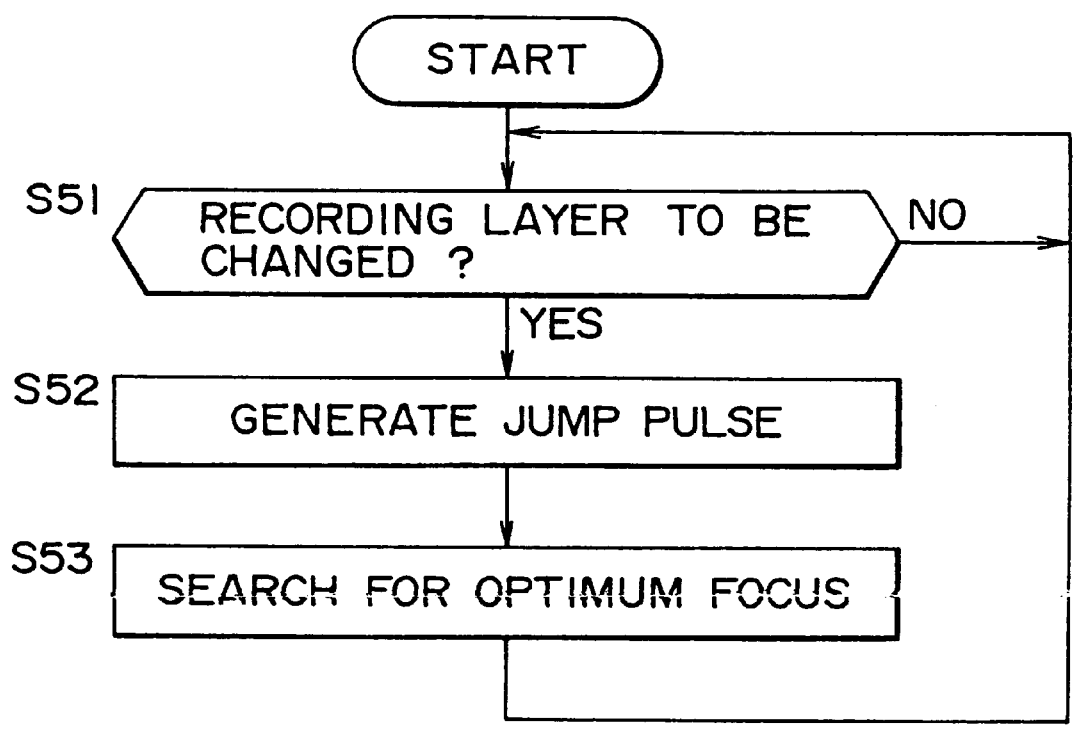
FIG. 9 is a flow chart illustrating alternative operation for reproduction of an optical disk.
Figure 10:
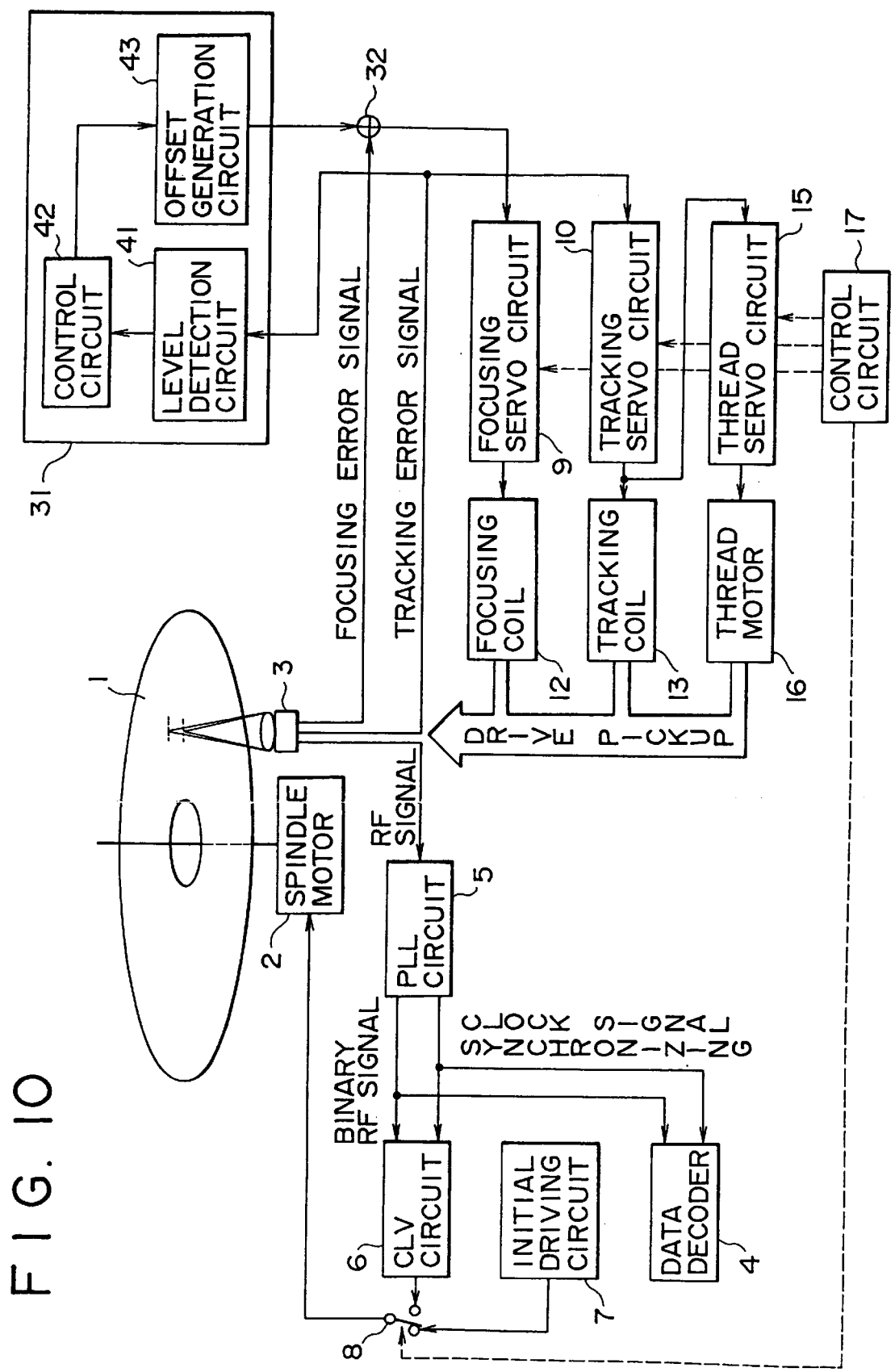
FIG. 10 is a block diagram of another optical disk reproduction apparatus which executes the processing of FIG. 9 and in which another recording and/or reproduction apparatus of the present invention is incorporated.

FIG. 9 illustrates such processing as just described. Referring to FIG. 9, first in step S51, the production apparatus waits until an instruction to change the object record layer upon which light is to be focused is developed. When a changing instruction is developed, the control sequence advances to step S52, in which jump pulses with which the focus position is to be jumped to the designated record layer are generated by the focusing servo circuit 9. Consequently, the optical head 3 is jumped in the focusing direction to a position at which it can be focused upon the designated record layer.

Then, the control sequence advances to step S53, in which processing of searching for an optimum focus position in the record layer to which the optical head 3 has just been jumped is executed. The optimum focus searching processing in this instance is similar to the processing of step S2 in FIG. 3.

When the optimum focus searching processing comes to an end in step S53, the control sequence returns to step S51 so that similar processing is executed repetitively. In other words, such processing as described above is performed each time the object record layer is changed.

Accordingly, in this instance, the control circuit 42 of the tracking error signal maximum amplitude search circuit 31 of the reproduction apparatus for the optical disk 1 controls, when it controls the offset generation circuit 43 to generate an offset signal with which the tracking error signal detected by the level detection circuit 41 exhibits a maximum amplitude, the offset generation circuit 43 to thereafter generate the offset signal continuously. As a result, where the present processing is employed, the optimum focus offset position storage circuit 33 shown in FIG. 1 is unnecessary.

Figure 11:
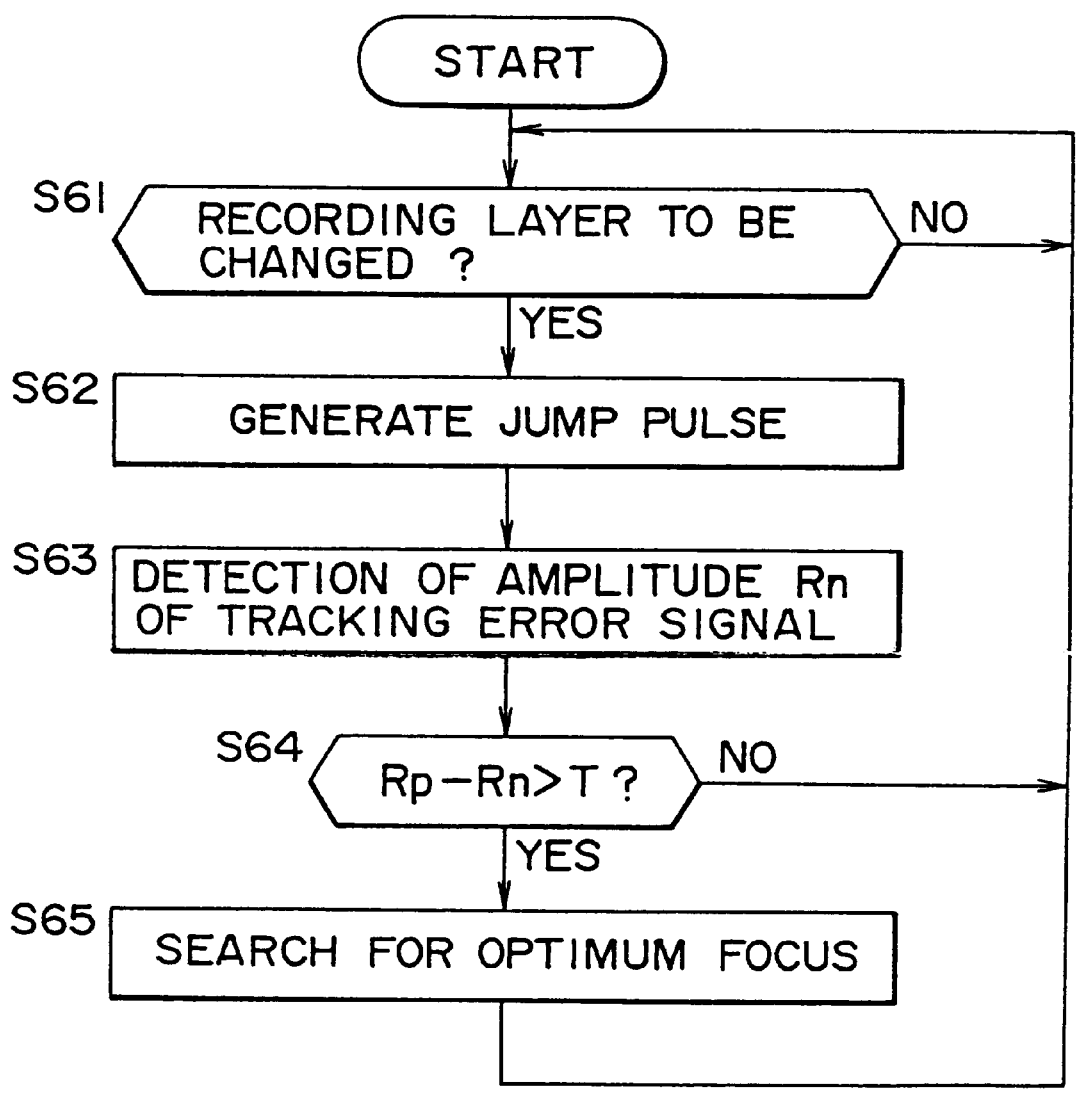
FIG. 11 is a flow chart illustrating different operation of the optical disk reproduction apparatus of FIG. 1.

FIG. 11 illustrates a further example of operation a reproduction apparatus for an optical disk. While, in the optimum focus searching processing illustrated in FIG. 9, the processing is executed each time the object record layer is changed, this requires much time until it becomes possible, each time the record layer is changed, to actually reproduce data. The processing illustrated in FIG. 11 can reduce the time.

Referring to FIG. 11, first in step S61, the production apparatus waits until an instruction to change the object record layer is developed. When an instruction to change the object record layer is developed, the control sequence advances to step S62, in which jump pulses are generated from the focusing servo circuit 9 to move the optical head 3 toward the object record layer.

Thereafter, the control sequence advances to step S63, in which processing of detecting the amplitude of the tracking error signal then is executed. In particular, the control circuit 42 of the tracking error signal maximum amplitude search circuit 31 reads an amplitude value of the tracking error signal outputted from the level detection circuit 41 then and places the thus read value into Rn.

Where the present processing is employed, the reproduction apparatus is constructed in such a manner as shown in FIG. 1. The detected value Rn is supplied to and stored into the optimum focus offset position storage circuit 33. In the optimum focus offset position storage circuit 33, also an amplitude of the tracking error detected during reproduction of the preceding record layer is stored as $R_p$. Thus, in step S64, it is discriminated whether or not the value of $R_p$–Rn is higher than a reference value T set in advance.

In particular, when the amplitude Rn obtained at present is higher than the amplitude $R_p$ obtained in the preceding operation cycle or the amplitude Rn is lower than the amplitude $R_p$ but the difference between them is smaller than the reference value T, the focus offset value is maintained determining that data can be reproduced with sufficient stability without particularly changing the focus offset value. In other words, the same offset value as that upon reproduction of the preceding record layer is generated continuously. Then, the control sequence returns to step S61 so that the processing in steps S61 et seq. is executed repetitively.

On the other hand, when the amplitude Rn at present is smaller than the preceding amplitude $R_p$ and the difference between them is larger than the reference value T, the control sequence advances from step S64 to step S65, in which optimum focus searching processing is executed. The optimum focus searching processing is similar to the processing in step S2 of FIG. 3 or in step S53 of FIG. 9. Then, when the optimum focus searching processing comes to an end, the control sequence returns to step S61 so that the processing in steps S61 et seq. is executed repetitively.

In short, in the present processing, since focus searching processing is executed only when the amplitude of the tracking error signal does not exhibit a sufficient magnitude originating from a displacement of the focus offset, the number of times by which focus searching processing is executed can be reduced comparing with that in the processing illustrated in FIG. 9. Consequently, reproduction of data from the record layer can be started more rapidly as much.

Figure 12:
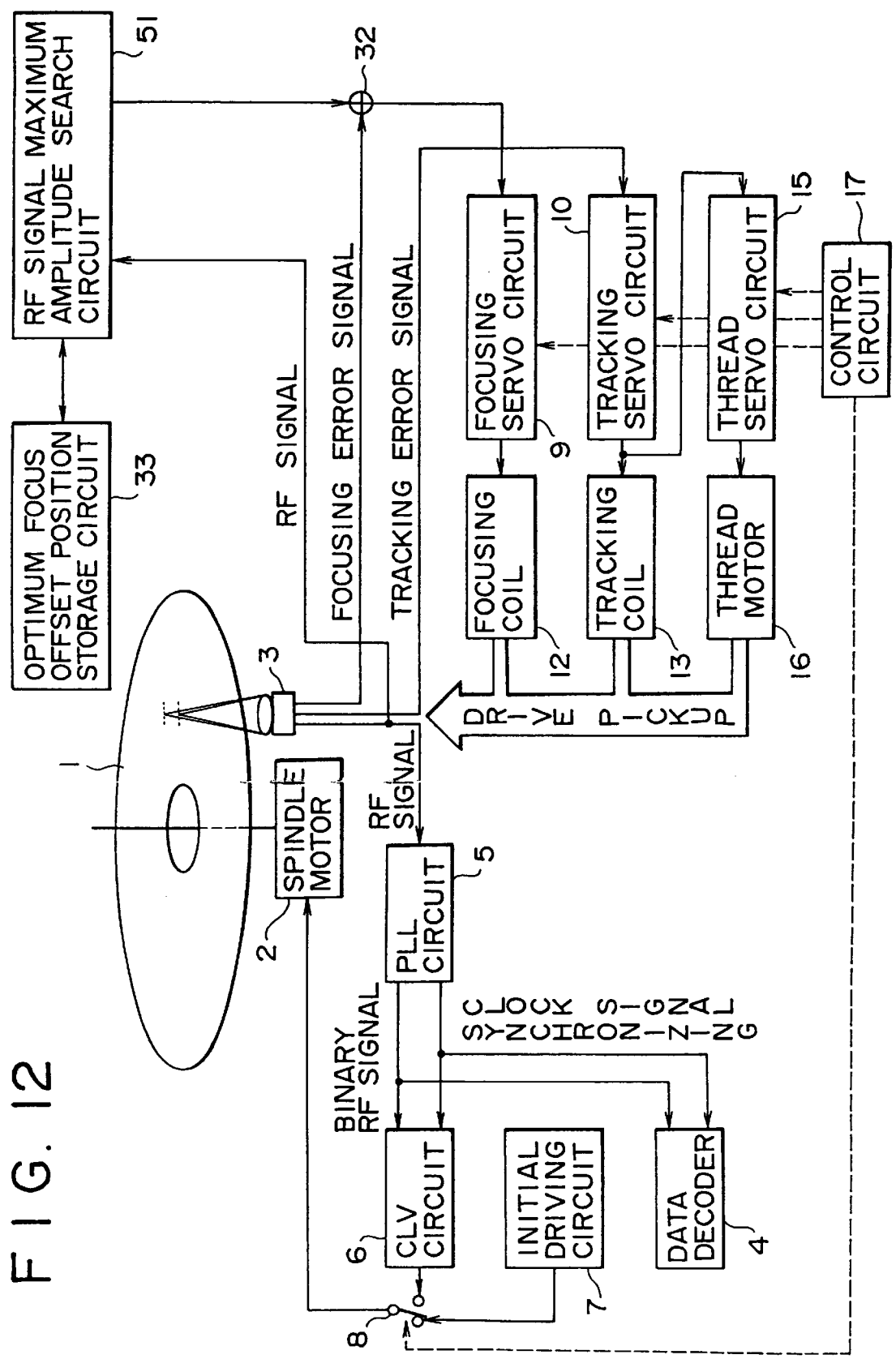
FIG. 12 is a block diagram showing a further optical disk reproduction apparatus in which a further recording and/or reproduction apparatus of the present invention is incorporated.

FIG. 12 shows another embodiment of a further optical disk reproduction apparatus in which a further recording and/or reproduction apparatus of the present invention is incorporated. In the present embodiment, the tracking error signal maximum amplitude search circuit 31 of FIG. 1 is replaced by a RF signal maximum amplitude search circuit 51. A RF signal outputted from the optical head 3 is inputted to the RF signal maximum amplitude search circuit 51.

The RF signal maximum amplitude search circuit 51 includes a level detection circuit, a control circuit and an offset generation circuit (not shown) similarly to the tracking error signal maximum amplitude search circuit 31 reproduction apparatus is similar to that of the reproduction apparatus shown in FIG. 1.

In particular, in the embodiment of FIG. 12, when an instruction to start a reproduction operation is developed, the control circuit 17 first feeds the optical head 3 to the position of the innermost circumferential track of the optical disk 1 and then drives the spindle motor 2 to rotate the optical disk 1. Thereafter, the focusing servo circuit 9 and the tracking servo circuit 10 are both put into an operative condition. Consequently, focusing servoing and tracking servoing are applied.

The relationship between the focus offset and the amplitude of the RF signal in this condition is illustrated by graphs in FIGS. 2, 5 and 7. In particular, when the focus offset of the optical head 3 with respect to a record layer of the optical disk 1 is set to an optimum value, the RF signal exhibits a maximum amplitude. Accordingly, by detecting a maximum value of the amplitude of the RF signal by means of the RF signal maximum amplitude search circuit 51 in a similar manner as in that when a maximum value of the amplitude of the tracking error signal is detected, an optimum point can be searched for and set. Since the processing is similar to that of the optical disk reproduction apparatus described hereinabove with reference to FIG. 1, description thereof is omitted here.

Figure 13:
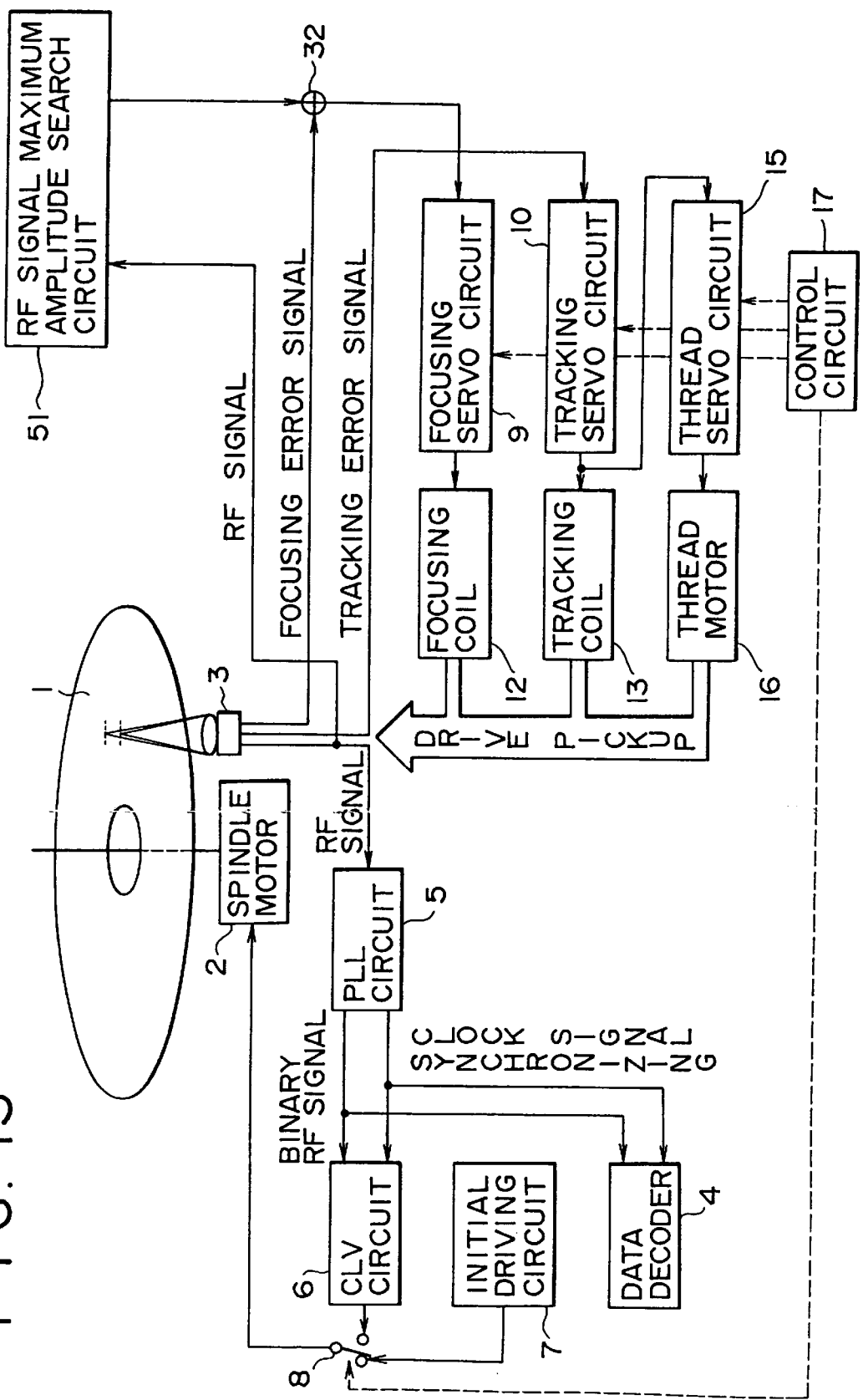
FIG. 13 is a block diagram showing a still further optical disk reproduction apparatus in which a still further recording and/or reproduction apparatus of the present invention is incorporated.

On the other hand, when optimum focus searching processing is executed using a RF signal each time the object record layer is changed as shown in FIG. 9, the optimum focus offset position storage circuit 33 shown in FIG. 12 is unnecessary. Consequently, the reproduction apparatus has such a construction which eliminates the optimum focus offset position storage circuit 33 as shown in FIG. 13.

Further, when searching for a maximum amplitude is performed using a RF signal, where the processing illustrated in FIG. 3 or 11 is employed, the reproduction apparatus requires the optimum focus offset position storage circuit 33 as seen in FIG. 12.

Figure 14:
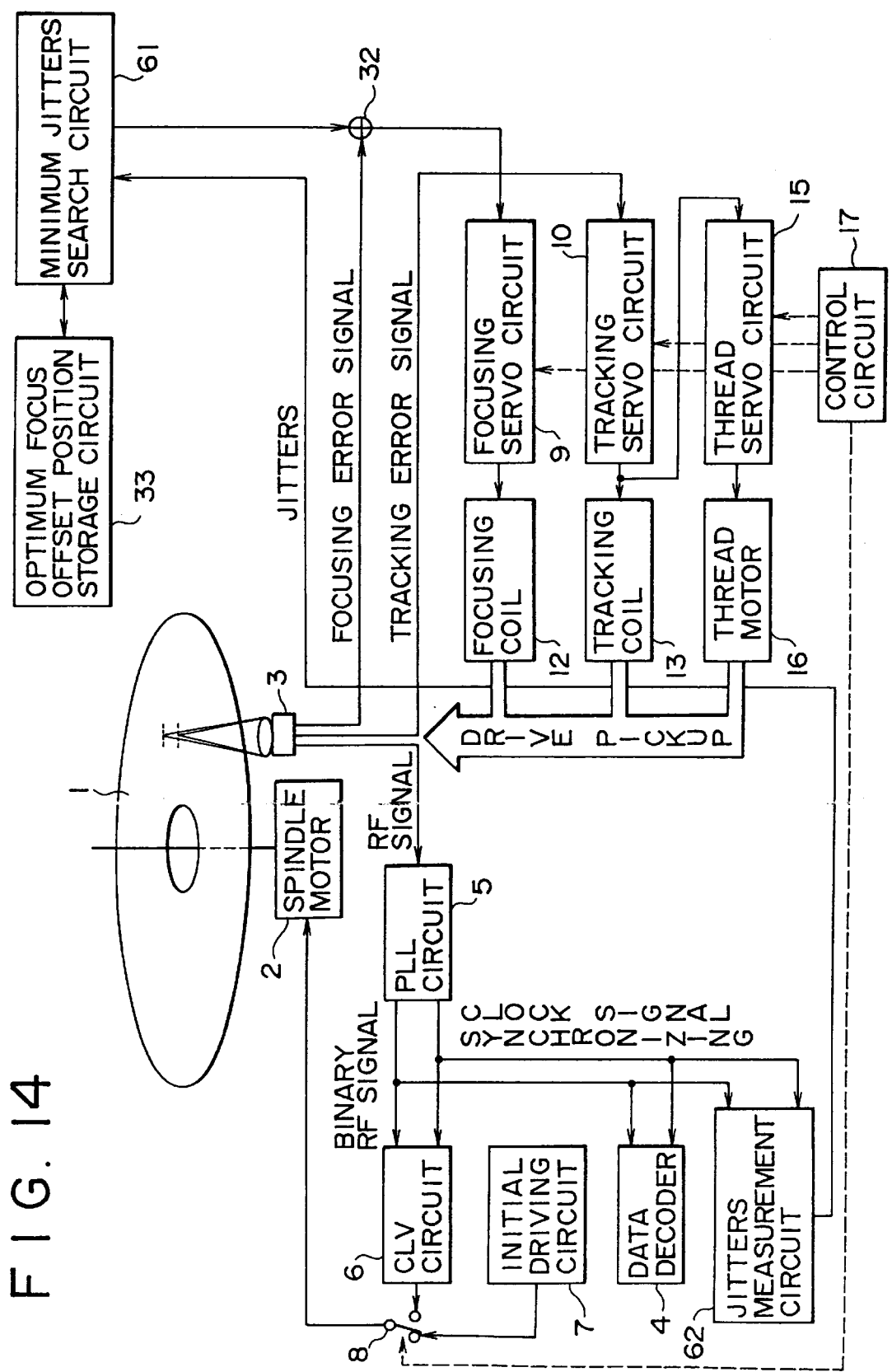
FIG. 14 is a block diagram showing a yet further optical disk reproduction apparatus in which the recording and/or reproduction apparatus of the present invention is incorporated.

FIG. 14 shows a yet further optical disk reproduction apparatus embodying the present invention. In the present embodiment, a minimum jitters search circuit 61 is provided in place of the tracking error signal maximum amplitude search circuit 31 of the embodiment of FIG. 1. A jitters measurement circuit 62 detects jitters from an output of the PLL circuit 5 and outputs the detected jitters to the minimum jitters search circuit 61. The minimum jitters search circuit 61 includes, similarly to the tracking error signal maximum amplitude search circuit 31 shown in FIG. 1, a level detection circuit, a control circuit and an offset generation circuit not shown.

The other construction of the optical disk reproduction apparatus of FIG. 14 is similar to that of the optical disk reproduction apparatus of FIG. 1.

The jitters measurement circuit 62 detects an absolute value of the phase difference between a binary RF signal and a synchronizing clock signal outputted from the PLL circuit 5 and outputs it as jitters to the minimum jitters search circuit 61. The relationship between the jitters and the focus offset is such as illustrated in FIG. 15.

Figure 15:
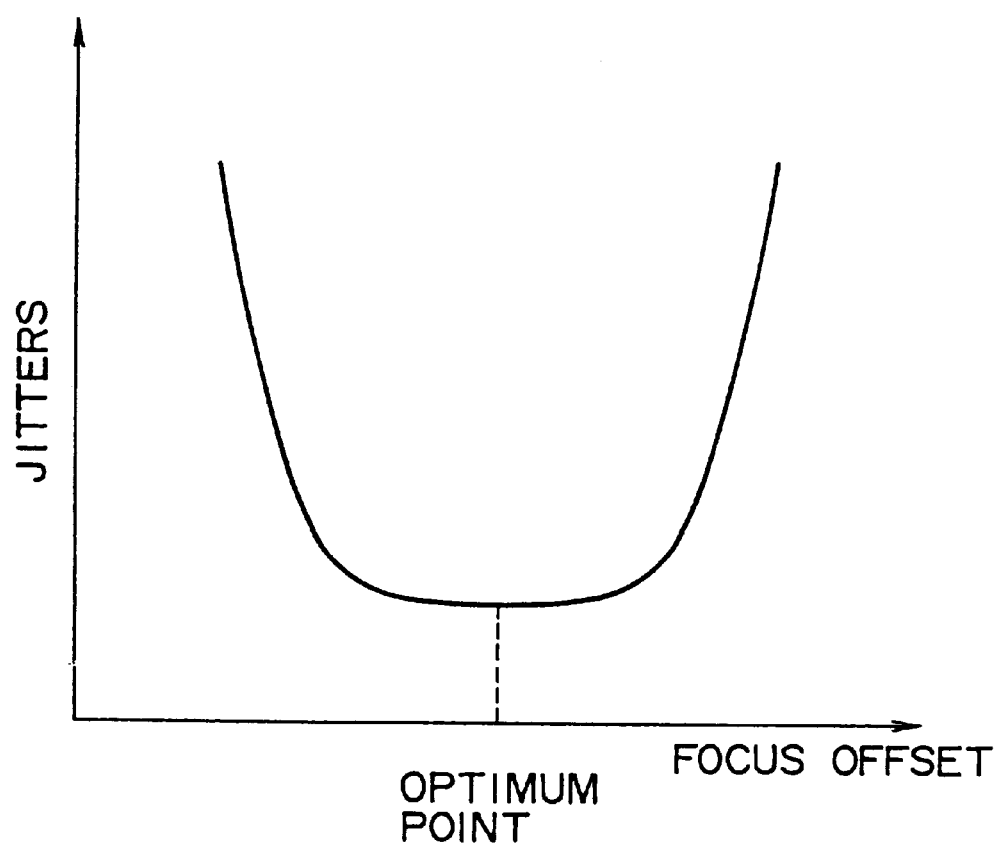
FIG. 15 is a graph illustrating a relationship between a focus offset and jitters.

In particular, as seen from FIG. 15, when the focus offset of the optical head 3 with respect to the optical disk 1 is optimum, the jitters are minimum, and as the focus offset is displaced from the optimum position, jitters increase. By detecting a minimum value of the jitters, an optimum point of the focus offset of the optical head 3 with respect to the optical disk 1 can be determined.

Figure 16:
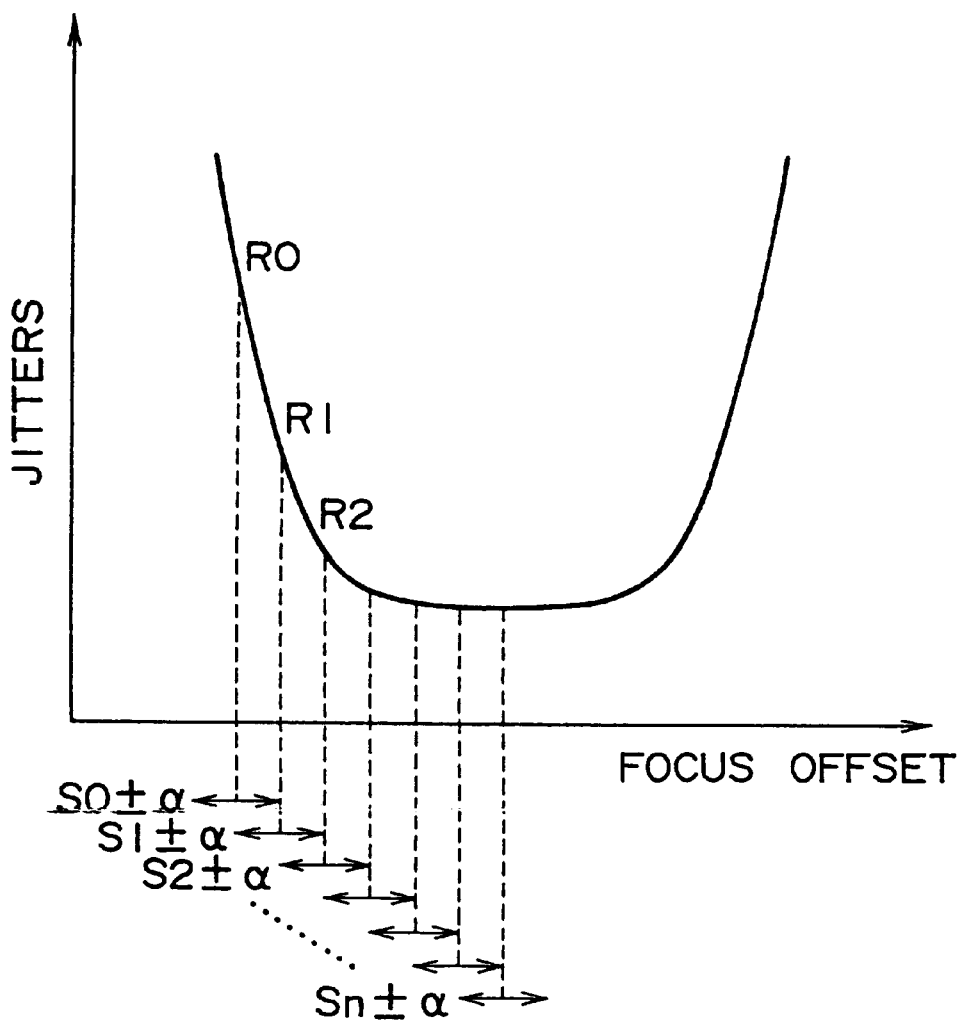
FIG. 16 is view illustrating a principle of detecting an optimum point by a mountain-climbing method.

The minimum value of the jitters can be calculated by such a mountain-climbing method as illustrated in FIG. 16. Referring to FIG. 16, the sampling point is successively shifted in an increasing direction by α. When the central sample value is lower than the left and right sample values, a sample point at which the central sample value is obtained is set as an optimum point.

Figure 17:
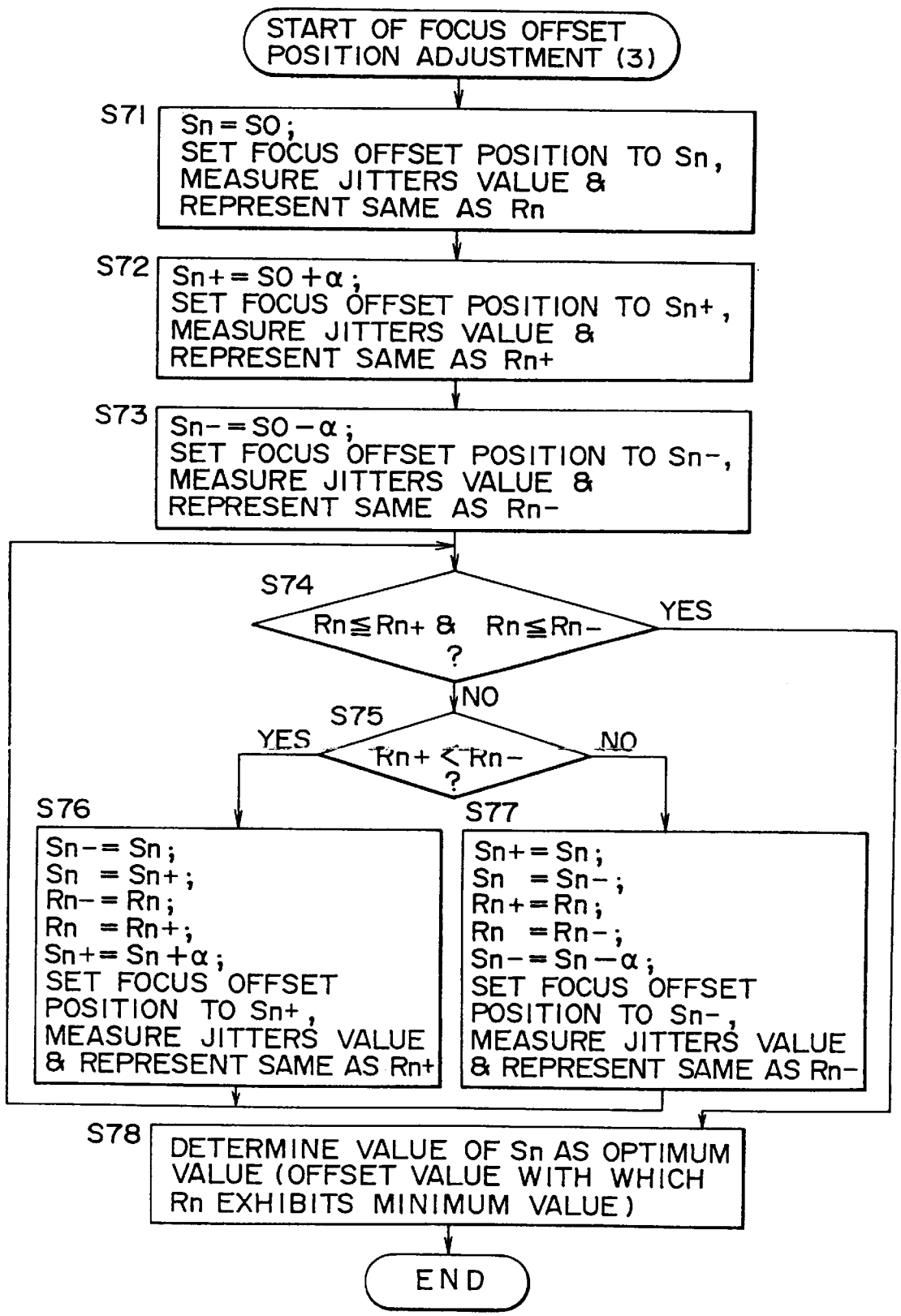
FIG. 17 is a flow chart illustrating processing of detecting an optimum point in accordance with the principle of FIG. 16.

FIG. 17 illustrates an example of processing of determining a minimum value of jitters by the mountain-climbing method.

Referring to FIG. 17, first in step S71, an initial value $S_0$ is placed into Sn. Then, the focus offset position is set to Sn (in the present instance, $Sn=S_0$). Further, the amplitude value (magnitude) of jitters in this instance is measured and a result of the measurement is placed into Rn (in the present instance, $Rn=R_0$).

In particular, the control circuit 42 controls the offset generation circuit 43 to generate an offset signal $S_0$. The focusing servo circuit 9 controls the focusing coil 12 in response to a focusing error signal to which the offset signal $S_0$ is added by the adder 32 to adjust the focus offset position of the optical head 3.

The level detection circuit 41 thereupon detects the amplitude of jitters outputted from the jitters measurement circuit 62 and outputs it to the control circuit 42. The control circuit 42 places the amplitude value detected then into Rn (in the present instance, $Rn=R_0$).

Thereafter, the control sequence advances to step S72, in which a value obtained by addition of $S_0$ and α is placed into Sn+. In particular, the following equation is calculated:

$$Sn+=S_0+\alpha$$

Then, the control circuit 42 controls the offset generation circuit 43 to generate the offset signal $Sn+(=S_1)$. In particular, the control circuit 42 controls the offset generation circuit 43 to generate an offset value higher by α than the offset value generated in step S71. Since the focusing servo circuit 9 controls the focusing coil 12 in response to the focus error signal to which the offset value is added, the optical head 3 further varies the focus offset position of the optical head 3 by an amount corresponding to the offset value α.

The level detection circuit 41 in this instance detects the amplitude of jitters outputted from the jitters measurement circuit 62. The control circuit 42 places the amplitude of jitters then detected by the level detection circuit 41 into Rn+(in this instance, $R_0+=R_1$).

Subsequently, the control sequence advances to step S73, in which a value lower by α than $S_0$ is placed into Sn−. In other words, the following equation is calculated:

$$Sn-=S_0-\alpha$$

In particular, the control circuit 42 controls the offset generation circuit 43 to generate a value lower by α than the offset signal Sn (in this instance, $Sn=S_0$) generated in step S71. Since the focus error signal to which the offset signal Sn− is added is supplied to the focusing coil 12 via the focusing servo circuit 9, the focus offset position of the optical head 3 is varied by an amount corresponding to the offset value −α from that when the offset value $S_0$ was generated.

The level detection circuit 41 detects the amplitude of jitters outputted from the jitters measurement circuit 62 then and outputs it to the control circuit 42. The control circuit 42 places the amplitude value of jitters then into Rn−(in this instance, $Rn-=R_0-$).

By the processing in steps S71 to S73 described above, the amplitude value Rn ($=R_0$) of jitters when the to the initial value $S_0$, the amplitude value $Rn+(=R_0+=R_1)$ of jitters when the offset signal is increased by α and the amplitude value $Rn-(=R_0-)$ of jitters when the offset value is decreased by α are obtained as seen in FIG. 16.

Thus, the control sequence advances to step S74, in which it is discriminated whether or not Rn is equal to or lower than Rn+ and besides Rn is equal to or lower than Rn−. In other words, it is discriminated whether or not Rn is lower than Rn− and Rn+(whether or not Rn is a minimum value).

Normally, although the amplitude Rn ($=R_0$) of jitters when the offset signal is $S_0$ is lower than the amplitude value $Rn-(=R_0-)$ when the offset signal is lower by a as seen in FIG. 16, it is higher than the amplitude $Rn+(=R_0+=R_1)$ of jitters when the offset signal is higher by α. Thus, in this instance, the control sequence advances to step S75, in which it is discriminated whether or not Rn+ is lower than Rn−. In this instance, since $Rn+(=R_0+=R_1)$ is lower than $Rn-(=R_0-)$ (since the curve portion is in a rightwardly descending section in FIG. 16), the control sequence advances to step S76.

In step S76, Sn ($=S_0$) till then is placed into Sn−. Then, $Sn+(=S_1)$ till then is placed into new Sn, Rn ($=R_0$) till then is placed into Rn−, and $Rn+(=R_1)$ till then is placed into Rn. Further, a value ($=S_0+2\alpha=S2$) obtained by addition of α to new Sn ($=S_0+\alpha=S_1$) is placed into Sn+. In other words, the following equation is calculated:

$$Sn+=Sn+\alpha$$

The control circuit 42 controls the offset generation circuit 43 to generate $Sn+(=S2)$ as an offset signal. In particular, the control circuit 42 controls the offset generation circuit 43 to generate an offset $Sn+(=S_0+2\alpha=S2)$ higher by α than Sn+

($=S_0+\alpha$) generated in step S72. Then, the amplitude of jitters detected then is placed into Rn+(=R$_1$+=R2).

In other words, as a result, the amplitude values of jitters at the three sampling points S$_0$, S$_1$ and S$_2$ shifted rightwardly by $\alpha$ from those in the preceding scanning are set to Rn−(=R$_0$), Rn (=R$_1$) and Rn+(=R$_2$), respectively.

Then, the control sequence returns to step S74, in which it is discriminated whether or not Rn is lower than Rn− and Rn+. When Rn is not a minimum value, the control sequence advances to step S75, in which it is discriminated again whether or not Rn+ is lower than Rn−. When Rn+ is lower than Rn−, the control sequence advances to step S76 so that similar processing is repeated.

Then, when the section for sampling is successively shifted in the rightward direction in FIG. 16 until Sn reaches an optimum point, the amplitude value Rn obtained then is lower than Rn− and lower than Rn+. In other words, Rn is a minimum value. Thus, in this instance, the control sequence advances from step S74 to step S78, in which the value of Sn then is set as an optimum value with which the value of jitters exhibits a maximum value. In other words, the control circuit 42 controls the offset generation circuit 43 to generate the offset signal Sn as an optimum value continuously.

On the other hand, when sampling is proceeding in a rightwardly ascending section in FIG. 16, the value of Rn+ is higher than Rn−. Thus, in this instance, the control sequence advances from step S75 to step S77, in which Sn till then is placed into Sn+, Sn− till then is placed into Sn−, Rn till then is placed into Rn+, and Rn− till then is placed into Rn. Then, a value lower by $\alpha$ than new Sn is placed into Sn−. In other words, the following equation is calculated.

$$Sn-=Sn-\alpha$$

In particular, the sampling point on the left side in FIG. 16 is sampled with Sn−. Then, the amplitude of jitters when the offset signal Sn− is generated from the offset generation circuit 43 is detected, and the detected amplitude value is placed into Rn−.

Then, the control sequence returns to step S74, in which it is discriminated whether or not Rn is lower than Rn− and Rn+. In the rightwardly ascending section in FIG. 16, since Rn is still higher than Rn−, the control sequence advances to step S75 and then from step S75 to step S77 so that similar processing is repeated. When the sampling point successively advances in the leftward direction (toward an optimum point) until Sn reaches an optimum point, Rn is lower than Rn+ and lower than Rn−. In this instance, the control sequence advances from step S74 to step S78, in which the value of the offset signal Sn then is determined as an optimum value. Then, the control circuit 42 thereafter controls the offset generation circuit 43 to generate the optimum value continuously.

Further, similarly as in the processing illustrated in FIG. 7, a sudden descending variation point Sm$_2$ and a sudden ascending variation point Sm$_1$ are calculated. Thus, a middle point between them can be determined as an optimum point with which the jitters exhibit a minimum value.

Figure 18:
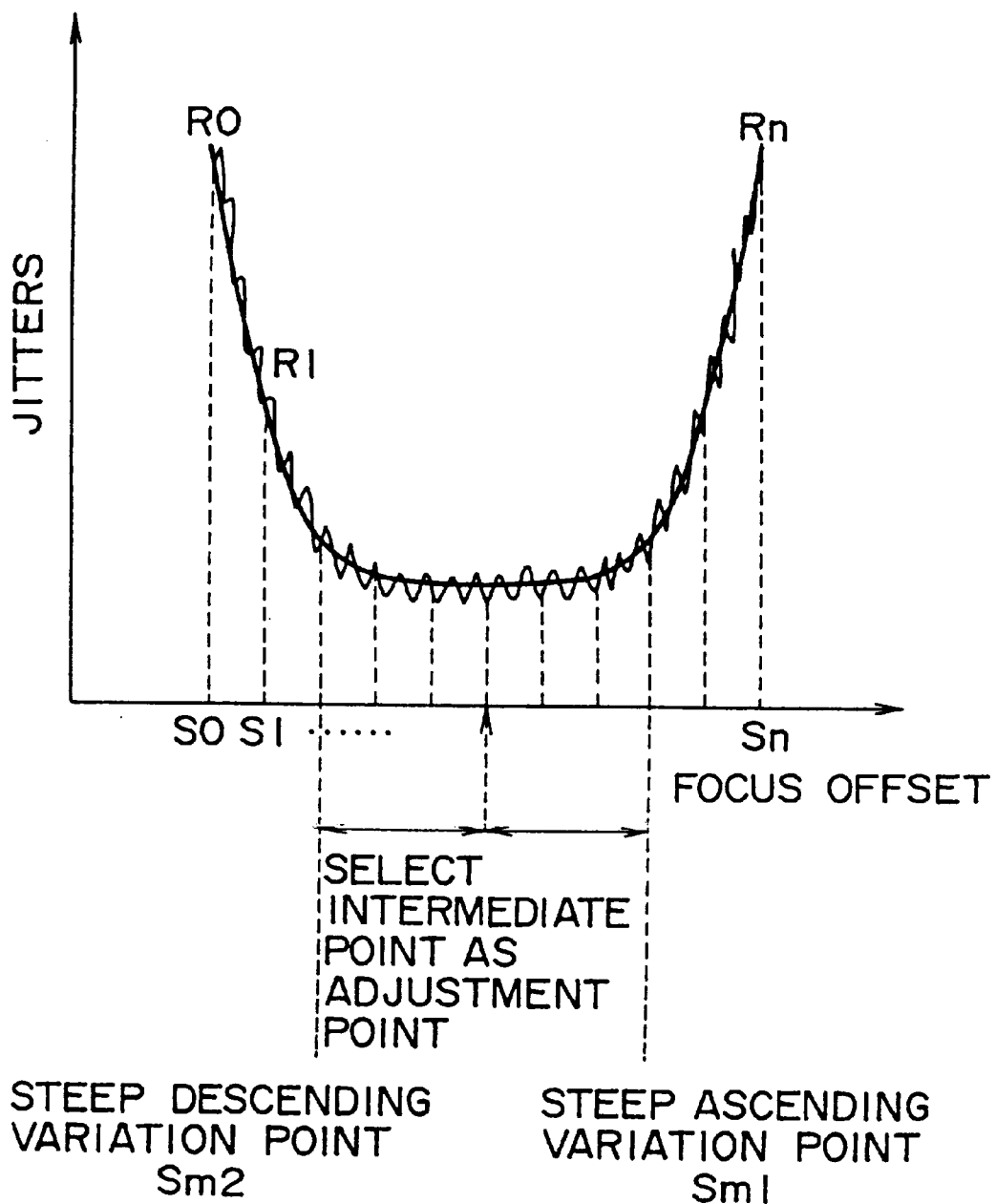
FIG. 18 is a graph illustrating a principle of detecting an optimum point from a sudden descending variation point and a sudden ascending variation point.

In particular, in this instance, in the section of the sample points S$_0$ to Sn, sample values R$_0$ to Rn are calculated in advance as seen in FIG. 18. Then, the variation points Sm$_1$ and Sm$_2$ are determined from those sample values, and a middle point between them is determined.

Figure 19:
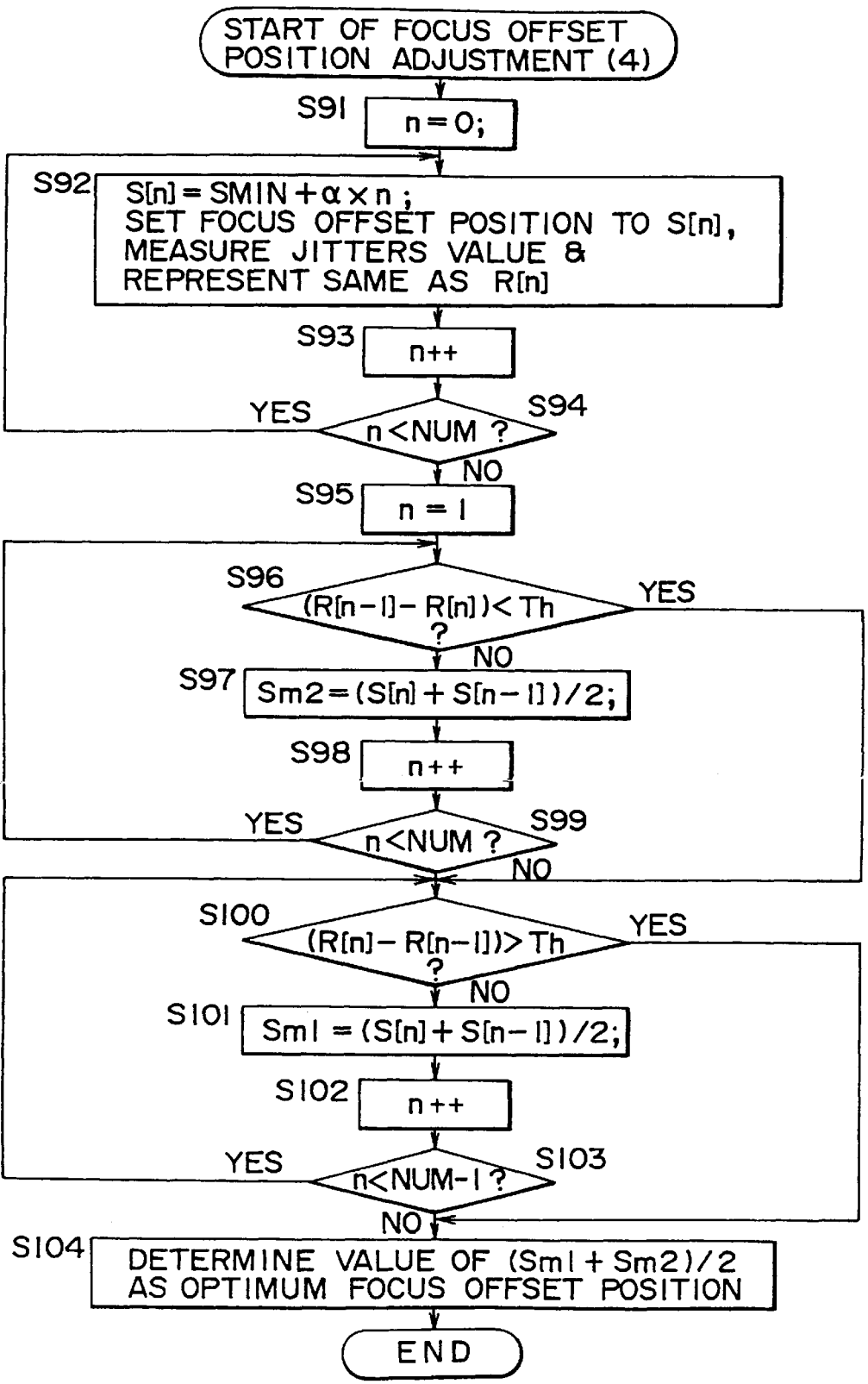
FIG. 19 is a flow chart illustrating processing of detecting an optimum point in accordance with the principle illustrated in FIG. 18.

FIG. 19 illustrates an example of processing in this instance. Referring to FIG. 19, in the processing illustrated, 0 is initially placed into the variable n first in step S91, and then in step S92, the following equation is calculated.

$$S[n]=SMIN+\alpha \times n$$

where SMIN is a minimum value of the offset adjustment value, and $\alpha$ is a width or step size with which the offset value is varied stepwise.

In the present case, since n=0, S[0] is set to SMIN.

The control circuit 42 controls the offset generation circuit 43 to generate the signal S[n] (in this instances S[0]=SMIN). Then, the amplitude of jitters then is detected by the level detection circuit 41, and the value thereof is placed into R[n] (=R[0]).

Thereafter, the control sequence advances to step S93, in which the variable n is incremented by 1 (to n=1). In step S94, it is discriminated whether or not the variable after incremented is lower than NUM. The character NUM represents a value given, where a maximum value of the offset value is represented by SMAX, by (SMAX−SMIN)/$\alpha$. In other words, NUM represents the number of samples within the focus offset scanning range.

When n is lower than NUM, since this signifies that all sampling points are not yet sampled, the control sequence returns to step S92, in which the following equation is calculated:

$$S[n]=SMIN+\alpha \times n$$

In particular, in the present processing, a value higher by $\alpha$ than SMIN is set as an offset signal S[1]. Then, the amplitude of jitters when the offset signal S[1] is generated is measured, and a value of it is set as R[1].

Thereafter, the control sequence advances to step S93, in which the variable n is incremented by 1, in this instance, to n=2. Then, when it is discriminated in step S94 that the variable n (=2) is lower than NUM, the control sequence returns to step S92 so that similar processing is executed repetitively. In this manner, amplitude values R$_0$ to Rn of jitters at the sampling points of S$_0$ to Sn shown in FIG. 18 are obtained.

When sampling within the search range is completed in such a manner as described above, the variable n becomes equal to NUM. Thus, the control sequence now advances from step S94 to step S95, in which the variable n is initially set to 1. Then in step S96, it is discriminated whether or not the difference between the amplitude value R[n] of the reference point at present and the preceding amplitude value R[n−1] is lower than a reference value Th set in advance. In particular, it is discriminated whether or not the value of R[0]−R[1] is lower than Th. Since the rightwardly descending characteristic is presented in a first section of the sampling range, R[0] is sufficiently higher than R[1] (the difference (R[0]−R[1]) between them is higher than Th). Thus, the control sequence advances to step S97, in which a middle value between the sampling points S[n] and S[n−1] is set as the variation point Sm$_2$. In other words, the following equation is calculated:

$$Sm_2=(S[n]+S[n-1])/2$$

In the present case, a middle point between S[1] and S[0] is set as Sm$_2$.

Then, the control sequence advances to step S98, in which the variable n is incremented by 1 (to n=2), and then to step S99, in which it is discriminated whether or not the variable n is lower than NUM. When the variable n is lower than NUM, the control sequence returns to step S96, in which it is discriminated whether or not the value of R[1]−R[2] is lower than Th. As seen in FIG. 18, within a period within which the jitters vary by a comparatively great amount, the difference between the two sample values is higher than the reference value Th. Therefore, the control sequence advances again to step S97, in which the value of (S[2]+S[1])/2 is placed into $Sm_2$. In other words, the value on the side spaced rightwardly by α from the location in the preceding cycle is placed into $Sm_2$.

Then in step S98, the variable n is incremented by 1 again to n=3, and then the control sequence returns from step S99 to step S96 to repetitively execute similar processing.

Then, as the sampling point is successively shifted rightwardly in FIG. 18, the rate of change of jitters decrease gradually. Thereafter, when it is discriminated that the value of R[n−1]−R[n] is lower than Th, the control sequence advances from step S96 to step S100. In other words, in this instance, a variation point (sudden descending variation point) from a section in which the rate of change of the amplitude of jitters is high to another section in which the rate of change is low is set as $Sm_2$.

In steps S100 et seq., a point of variation at which the rate of change of the amplitude of jitters increases suddenly from a period within which the rate of change gradually increases to another period within which the rate of change increases suddenly is detected as a sudden ascending variation point $Sm_1$.

To this end, in step S100, it is discriminated whether or not the value of R[n]−R[n−1] is higher than the reference value Th. Within a period within which the sample value R[n−1] on the left side is higher than the sample value R[n] on the right side (within a rightwardly descending period) and within a period within which the sample value R[n] on the right side is higher than the sample value R[n−1] on the left side but the difference between them is small, the value of R[n]−R[n−1] is lower than the reference value Th. Thus, the control sequence advances from step S100 to step S101, in which a value between S[n] and S[n−1] is placed into $Sm_1$. In other words, the following equation is calculated:

$$Sm_1=(S[n]+S[n-1])/2$$

Then, n is incremented by 1 in step S102, and it is discriminated in step S103 whether or not the variable n is lower than NUM−1 (whether or not the search range reaches the right end in FIG. 18). When the variable n is lower than NUM−1, the control sequence returns to step S100, in which similar processing is repeated for two sample values spaced by one sample distance on the right side in FIG. 18. Then, when the difference between the two sample values is lower than the reference value Th, the control sequence advances again to step S101, in which a middle value between the two sampling points is placed into $Sm_1$.

When the sampling point is successively shifted in the rightward direction in FIG. 18 in this manner until the sample value R[n] on the right side in FIG. 18 exhibits a sudden increase from the sample value R[n−1] on the left side, the difference between them (R[n]−R[n−1]) is equal to or higher than th e reference value Th. In this instance, a middle value between the sampling points S[n−1] and S[n] is placed in $Sm_1$. Then, the value then is determined as a sudden ascending variation point $Sm_1$.

Since the sudden descending variation point $Sm_2$ has been calculated in step S97 and the sudden ascending variation point $Sm_1$ has been calculated in step S101 in this manner, the control sequence now advances to step S104, in which a middle point between the variation points $Sm_1$ and $Sm_2$ is determined as an optimum point. In other words, the value of $(Sm_1+Sm_2)/2$ is set as an optimum point.

It is to be noted that, when it is discriminated in step S99 that the variable n is equal to or higher than NUM, the control sequence advances from step S99 to step S100. On the other hand, when it is discriminated in step S103 that the variable n is equal to or higher than NUM−1, the control sequence advances from step S103 to step S104.

Where an optimum point is detected by the method illustrated in FIG. 7 or 18, even if noise is superposed with the tracking error signal, the RF signal or the jitters, an influence by the noise can be reduced.

Figure 20:
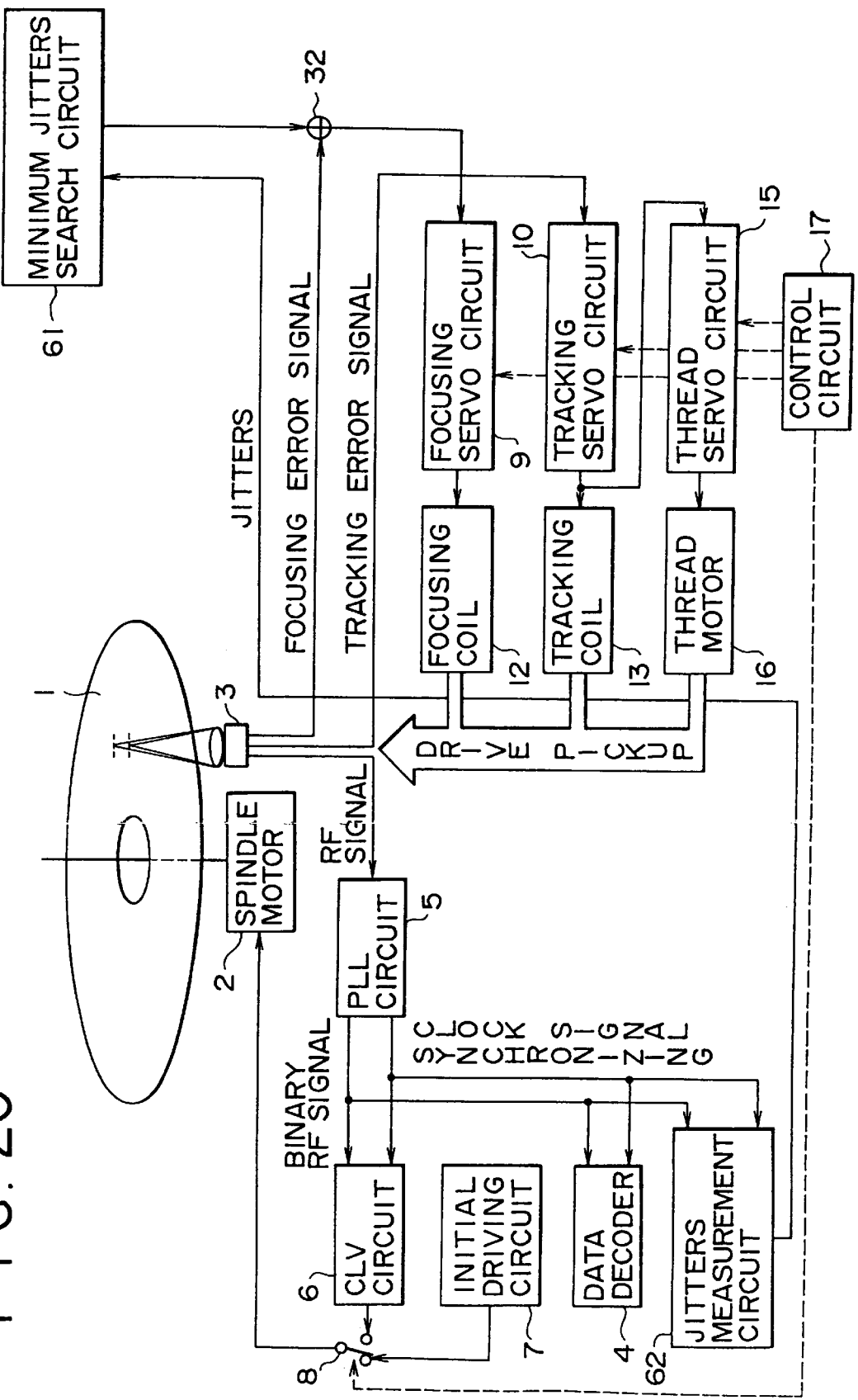
FIG. 20 is a block diagram showing a yet further optical disk reproduction apparatus in which a yet further recording and/or reproduction apparatus of the present invention is incorporated.

Also where an optimum focus offset position is searched for using jitters, the processing illustrated in FIG. 3 or 9 or the processing illustrated in FIG. 11 may be employed. Where an optimum focus offset position is searched for by the processing illustrated in FIG. 3 or 9, the reproduction apparatus is constructed in such a manner as shown in FIG. 14. In particular, in this instance, the optimum focus offset position storage circuit 33 is required. In contrast, where the processing illustrated in FIG. 11 is employed, the optimum focus offset position storage circuit 33 is unnecessary as seen in FIG. 20.

While, in the foregoing embodiments, a recording and/or reproduction apparatus of the present invention is applied to an optical disk reproduction apparatus by way of an example, the present invention can be applied also to recording of information onto an optical disk.

Having now fully described the invention, it will be apparent to one of ordinary skill in the art that many changes and modifications can be made thereto without departing from the spirit and scope of the invention as set forth herein.

What is claimed is:

1. A recording/reproducing apparatus for an optical storage disk, comprising:

optical means for recording/reproducing data on/from said optical storage disk having a plurality of information bearing layers, said data represented by a plurality of signals including a focus error signal and a first signal wherein said first signal is a selected one of either a tracking error signal, an RF signal or a jitter signal;

production means for producing a focus offset signal for a first of said layers based on a value of said first signal associated with said layer when said optical means is recording/reproducing data on/from said first layer;

means for storing said value of said first signal;

means for comparing said value of said first signal to a corresponding value of said first signal for a second of said layers when said optical means is switched to recording/reproducing data on/from said second layer, wherein when said difference between said value and said corresponding value is less than a predetermined amount said focus offset signal for said first layer is used when recording/reproducing on/from said second layer, and when said difference between said value and said corresponding value is greater than said predetermined amount a new focus offset signal is generated for use in recording/reproducing on/from said second layer, wherein said focus offset signal or said new focus offset signal is identified as a selected signal;

addition means for generating a focus control signal by adding said focus offset signal to said focus error signal when said optical means is recording/reproducing data on/from said first layer, and for adding said selected signal to said focus error signal when said optical means is recording/reproducing data on/from said second layer; and focusing control means for controlling focus of said optical means in response to the focus control signal.

2. The apparatus according to claim 1, further comprising means for obtaining an optimum focus offset value as a function of said focus offset signal for each of said information bearing layers.

3. The apparatus according to claim 2, further comprising storage means for storing each respective optimum focus offset value.

4. A method for recording/reproducing data on/from an optical storage disk, comprising the steps of:

recording/reproducing data on/from said optical storage disk having a plurality of information bearing layers, said data represented by a plurality of signals including a focus error signal and a first signal, wherein said first signal is a selected one of either a tracking error signal, an RF signal or a jitter signal;

producing a focus offset signal for a first of said layers based on a value of said first signal associated with said layer when said optical means is recording/reproducing data on/from said first layer;

storing said value of said first signal;

comparing said value of said first signal to a corresponding value of said first signal for a second of said layers when said optical means is switched to recording/reproducing data on/from said second layer, wherein when said difference between said value and said corresponding value is less than a predetermined amount said focus offset signal for said first layer is used when recording/reproducing on/from said second layer, and when said difference between said value and said corresponding value is greater than said predetermined amount a new focus offset signal is generated for use in recording/reproducing on/from said second layer, wherein said focus offset signal or said new focus offset signal is identified as a selected signal;

generating a focus control signal by adding said focus offset signal to said focus error signal when said optical means is recording/reproducing data on/from said first layer, and for adding said selected signal to said focus error signal when said optical means is recording/reproducing data on/from said second layer; and controlling focus of recording/reproduction operation in response to the focus control signal.

5. The method according to claim 4, further comprising obtaining an optimum focus offset value as a function of said focus offset signal for each of said information searing layers.

6. The method according to claim 5, further comprising storing each respective optimum focus offset value.

7. A recording/reproducing apparatus for an optical storage disk, comprising:

optical means for recording/reproducing data on/from said optical storage disk having a plurality of information bearing layers, said data represented by a plurality of signals including a focus error signal and a first signal, wherein said first signal is a selected one of either a tracking error signal, an RF signal or a jitter signal;

production means for producing a focus offset value independently for each said layer based on a value of said first signal associated with said layer, said focus offset values being produced prior to recording/reproducing data on/from any of said layers for purposes other than production of focus offset values;

means for storing said focus offset values;

addition means for generating a focus control signal for a selected one of said layers by adding said focus offset value corresponding to said selected layer to said focus error signal when said optical means is recording/reproducing data on/from said selected layer; and focusing control means for controlling focus of said optical means in response to the focus control signal.

8. A method for recording/reproducing data on/from an optical storage disk, comprising the steps of:

recording/reproducing data on/from said optical storage disk having a plurality of information bearing layers, said data represented by a plurality of signals including a focus error signal and a first signal, wherein said first signal is a selected one of either a tracking error signal, an RF signal or a jitter signal;

producing a focus offset value independently for each said layer based on a value of said first signal associated with said layer, said focus offset values being produced prior to recording/reproducing data on/from any of said layers for purposes other than production of focus offset values;

storing said focus offset values;

generating a focus control signal for a selected one of said layers by adding said focus offset value corresponding to said selected layer to said focus error signal when said optical means is recording/reproducing data on/from said selected layer; and controlling focus of said recording/reproduction operation in response to the focus control signal.

* * * * *